US012579703B1

(12) United States Patent
Han et al.

(10) Patent No.: US 12,579,703 B1
(45) Date of Patent: Mar. 17, 2026

(54) ARTIFICIAL INTELLIGENCE-GENERATED BACKGROUNDS

(71) Applicant: Block, Inc., Oakland, CA (US)

(72) Inventors: Bo Han, San Francisco, CA (US);
Mark Dolan, El Cerrito, CA (US);
Jonathan Suhr, Brooklyn, NY (US);
Pierre Liebenberg, Norman, OK (US);
Kolten Robison, Aurora, CO (US);
John O'Brien-Carelli, Brooklyn, NY
(US); Marc David Perry, San
Anselmo, CA (US); **Man Wai Winnie
Yeung**, Sunnyvale, CA (US)

(73) Assignee: Block, Inc., Oakland, CA (US)

( * ) Notice: Subject to any disclaimer, the term of this
patent is extended or adjusted under 35
U.S.C. 154(b) by 259 days.

(21) Appl. No.: 18/455,510

(22) Filed: Aug. 24, 2023

(51) Int. Cl.
| | |
|---|---|
| *G06T 11/00* | (2006.01) |
| *G06F 40/40* | (2020.01) |
| *G06N 20/00* | (2019.01) |
| *G06T 3/40* | (2024.01) |
| *G06T 7/194* | (2017.01) |
| *G06T 7/90* | (2017.01) |
| *G06V 20/20* | (2022.01) |
| *G06V 20/50* | (2022.01) |

(52) U.S. Cl.
CPC .............. *G06T 11/00* (2013.01); *G06F 40/40*
(2020.01); *G06N 20/00* (2019.01); *G06T 3/40*
(2013.01); *G06T 7/194* (2017.01); *G06T 7/90*
(2017.01); *G06V 20/50* (2022.01); *G06T*
*2200/24* (2013.01); *G06T 2207/10024*
(2013.01)

(58) Field of Classification Search
CPC ........... G06T 11/00; G06T 3/40; G06T 7/194;
G06T 7/90; G06T 2200/24; G06T
2207/10024; G06F 40/40; G06N 20/00;
G06V 20/50
See application file for complete search history.

(56) References Cited

U.S. PATENT DOCUMENTS

| | | | | |
|---|---|---|---|---|
| 2015/0254759 A1* | 9/2015 | Varadarajan | ....... | G06Q 30/0641 |
| | | | | 705/27.1 |
| 2016/0092091 A1* | 3/2016 | Hanson | ............... | G06F 3/04886 |
| | | | | 715/763 |
| 2021/0106875 A1* | 4/2021 | Hansen | .............. | A63B 24/0087 |
| 2023/0052169 A1* | 2/2023 | George | .................. | G06T 17/00 |

(Continued)

*Primary Examiner* — Xiao M Wu
*Assistant Examiner* — Latrell Anthony Creary
(74) *Attorney, Agent, or Firm* — Lee & Hayes, P.C.

(57) ABSTRACT

Generating images of items with artificial intelligence (AI)-
generated backgrounds is described. An example process
includes capturing an image(s) of an item, obtaining first
image data that identifies a real-world background in the
image(s), and presenting a user interface for a user of an
electronic device to indicate a descriptor(s). The process
may further include receiving, via the user interface, an
indication of the descriptor(s), generating prompt data rep-
resenting a prompt(s) based at least in part on the descrip-
tor(s), sending the first image data and the prompt data to a
server computer(s), receiving, from the server computer(s),
second image data output by a trained AI model(s), the
second image data representing an AI-generated image(s)
with an AI-generated background(s), and presenting, based
at least in part on the second image data, a candidate
image(s) with the AI-generated background(s) for selection
by the user.

20 Claims, 13 Drawing Sheets

(56)           References Cited

U.S. PATENT DOCUMENTS

| | | | |
|---|---|---|---|
| 2024/0029460 A1* | 1/2024 | Brown | G06V 20/95 |
| 2024/0037859 A1* | 2/2024 | Markas | H04N 7/157 |
| 2024/0062404 A1* | 2/2024 | McKay | G06V 20/50 |
| 2024/0297957 A1* | 9/2024 | Bakunov | G06V 10/945 |
| 2025/0004557 A1* | 1/2025 | Ramirez-Aristizabal | G06V 40/15 |
| 2025/0054278 A1* | 2/2025 | Araujo | G06Q 30/0641 |
| 2025/0069751 A1* | 2/2025 | Hughes | G16H 50/20 |

* cited by examiner

900 ⬎

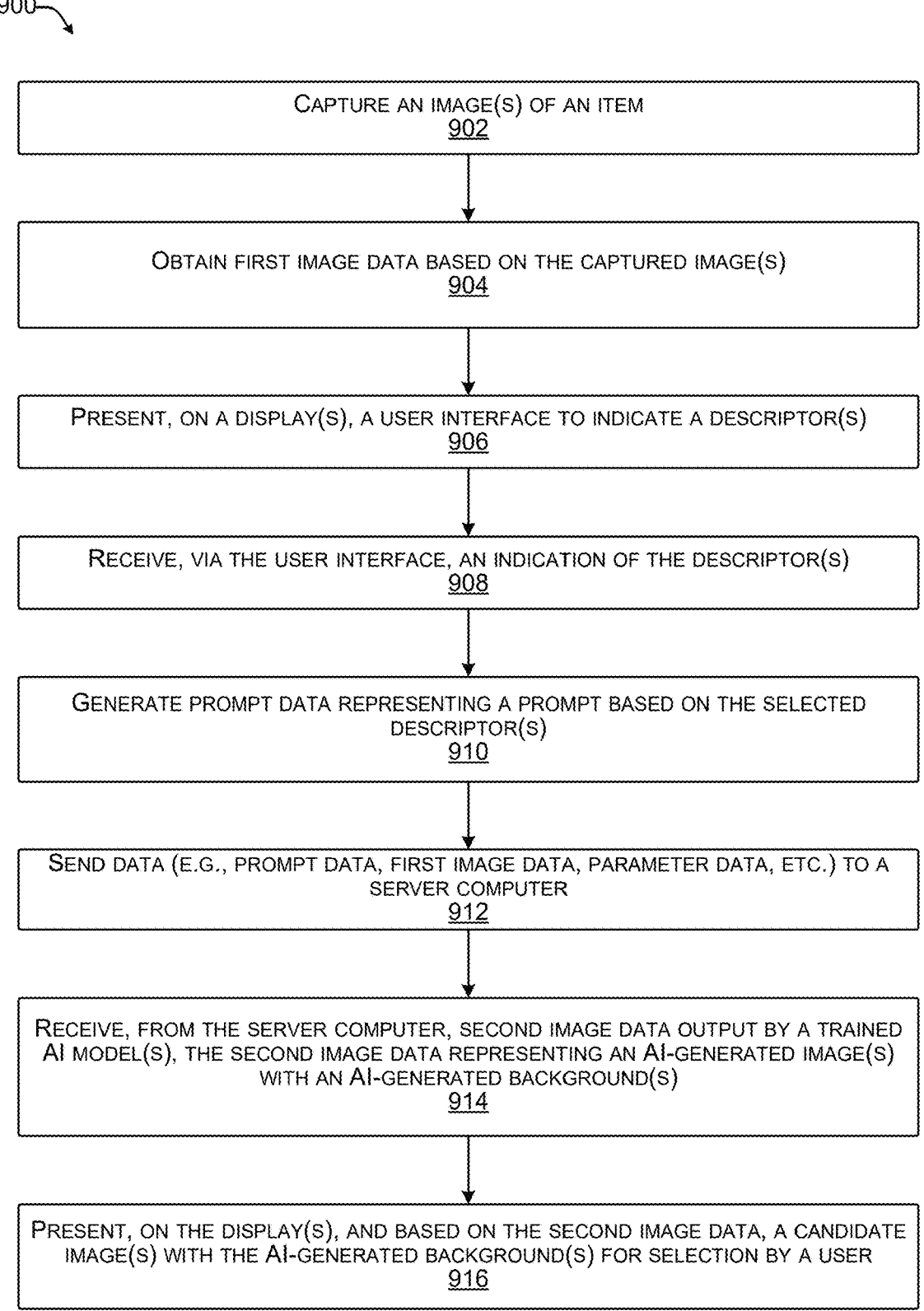

CAPTURE AN IMAGE(S) OF AN ITEM
902

OBTAIN FIRST IMAGE DATA BASED ON THE CAPTURED IMAGE(S)
904

PRESENT, ON A DISPLAY(S), A USER INTERFACE TO INDICATE A DESCRIPTOR(S)
906

RECEIVE, VIA THE USER INTERFACE, AN INDICATION OF THE DESCRIPTOR(S)
908

GENERATE PROMPT DATA REPRESENTING A PROMPT BASED ON THE SELECTED DESCRIPTOR(S)
910

SEND DATA (E.G., PROMPT DATA, FIRST IMAGE DATA, PARAMETER DATA, ETC.) TO A SERVER COMPUTER
912

RECEIVE, FROM THE SERVER COMPUTER, SECOND IMAGE DATA OUTPUT BY A TRAINED AI MODEL(S), THE SECOND IMAGE DATA REPRESENTING AN AI-GENERATED IMAGE(S) WITH AN AI-GENERATED BACKGROUND(S)
914

PRESENT, ON THE DISPLAY(S), AND BASED ON THE SECOND IMAGE DATA, A CANDIDATE IMAGE(S) WITH THE AI-GENERATED BACKGROUND(S) FOR SELECTION BY A USER
916

FIG. 9

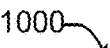
1000

RECEIVE DATA (E.G., PROMPT DATA, FIRST IMAGE DATA, PARAMETER DATA, ETC.) FROM AN ELECTRONIC DEVICE OF A USER
1002

GENERATE AN IMAGE MAP BASED ON THE FIRST IMAGE DATA AND USING A FIRST TRAINED AI MODEL(S)
1004

GENERATE ADDITIONAL SEED PARAMETERS?
1006

NO

YES

GENERATE ONE OR MORE ADDITIONAL SEED PARAMETERS
1008

GENERATE, USING A SECOND TRAINED AI MODEL, AND BASED ON THE IMAGE MAP, THE PROMPT DATA, AND THE PARAMETER DATA, SECOND IMAGE DATA REPRESENTING AN AI-GENERATED IMAGE(S) WITH AN AI-GENERATED BACKGROUND
1010

SEND THE SECOND IMAGE DATA TO THE ELECTRONIC DEVICE
1012

FIG. 10

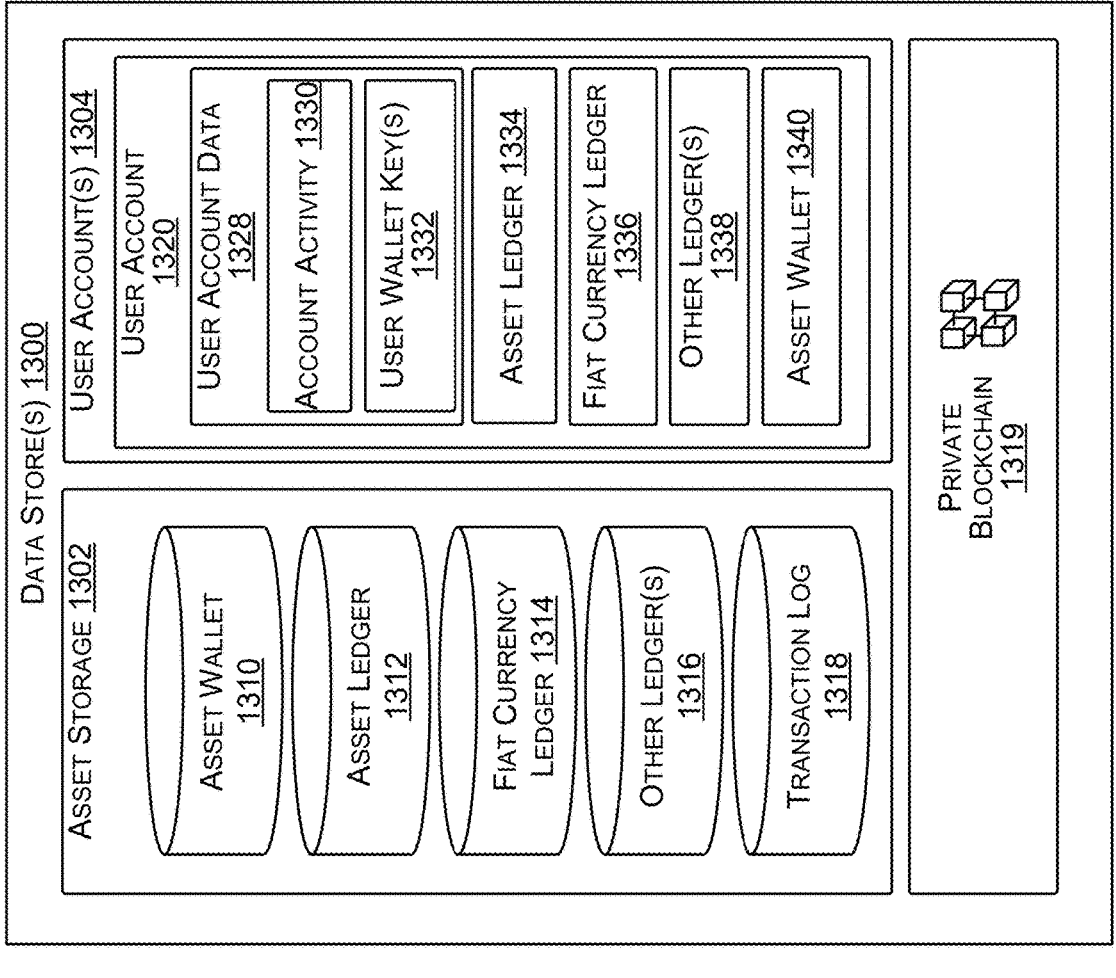
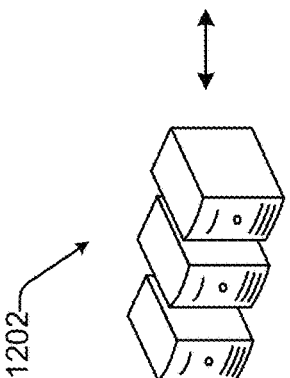
FIG. 13

ARTIFICIAL INTELLIGENCE-GENERATED BACKGROUNDS

TECHNICAL FIELD

Images of items may be generated with digital cameras. For example, a digital camera may take an image of a shoe that's placed on a table and that image may then be transmitted to other devices for display. To obtain these images, the items can be physically transported to a studio where a photographer captures professional images of the items in a studio setting. However, an image of an item may look better with a background different than the background that appears in the image. For example, an image of a hiking shoe may look more appealing with a background that is a cliff rather than a table. To get a different setting for the images, such as an outdoor setting, a photographer has to travel to a remote location to capture photographs of the item in the desired setting. Otherwise, the photographer may utilize props and other photography techniques to mimic a desired background.

BRIEF DESCRIPTION OF THE DRAWINGS

Features of the present disclosure, its nature and various advantages, will be more apparent upon consideration of the following detailed description, taken in conjunction with the accompanying drawings.

FIG. 9 is an example process for presenting, on a display(s) of an electronic device of a user, a candidate image(s) with an AI-generated background(s), according to an implementation of the present subject matter.

FIG. 10 is an example process for generating one or more images with AI-generated backgrounds, according to an implementation of the present subject matter.

FIG. 13 is an example data store used for performing techniques described herein.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
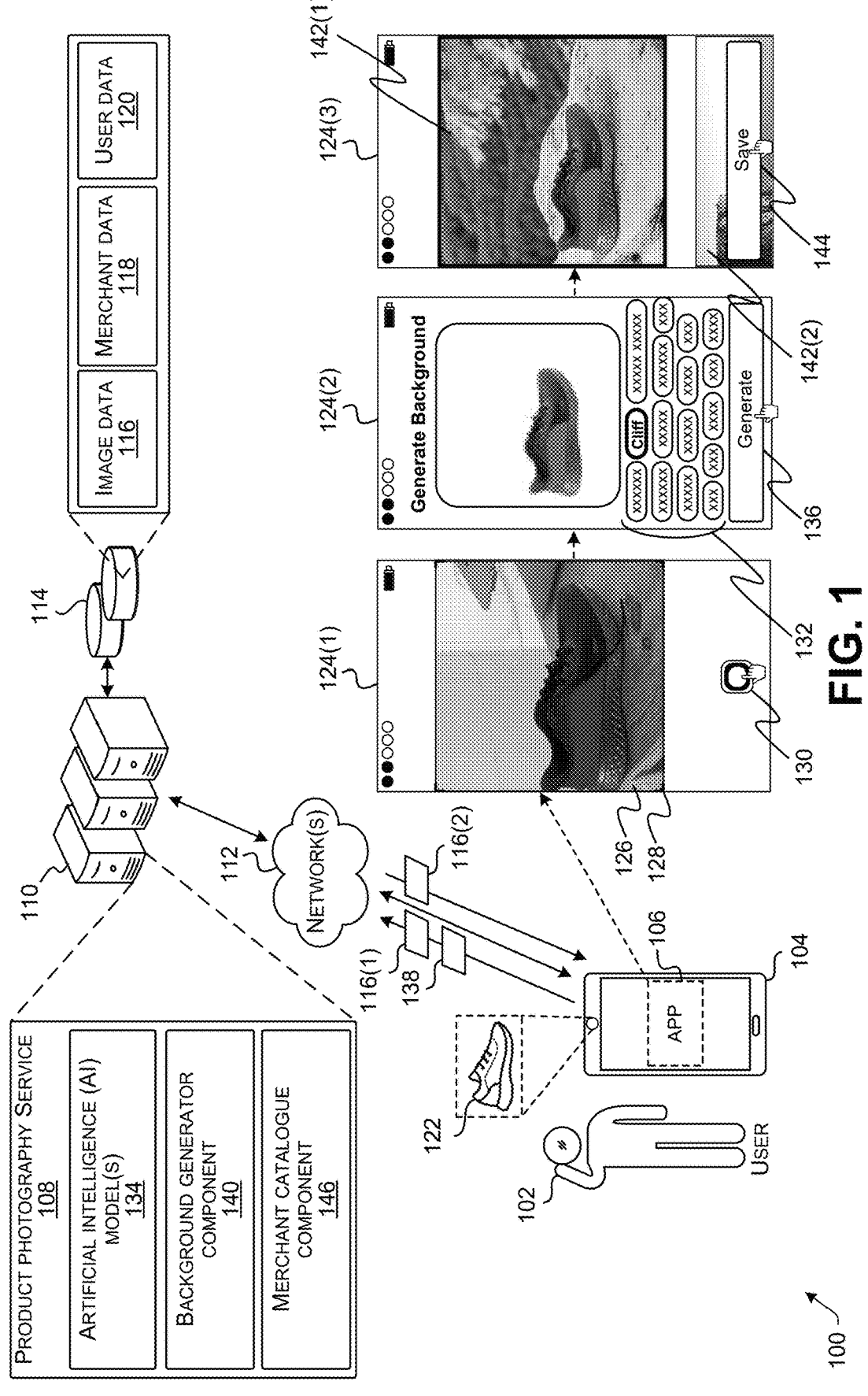
FIG. 1 is an example environment for generating images of items with artificial intelligence (AI)-generated backgrounds, according to an implementation of the present subject matter.

Described herein are, among other things, techniques, devices, and systems for generating images of items with AI-generated backgrounds. In the examples described herein, an electronic device of a user may have installed thereon an application for generating an image(s) of an item(s) with an AI-generated background(s). The application may be configured to access a camera(s) of the electronic device to capture images of items in the environment of the user. Based on a captured image(s) of an item, and using a trained AI model(s) to generate an AI-generated background(s), the application may cause an image(s) with the AI-generated background(s) to be presented on a display(s) of the electronic device. In this manner, an AI-generated background is substituted for a real-world background in the image(s) of the item that the user captured with the electronic device's camera(s).

In some examples, upon capturing an image(s) of an item with the electronic device, the application executing on the electronic device may obtain first image data that identifies a real-world background in the captured image(s). This can allow for, among other things, substituting an AI-generated background for the real-world background. In some examples, the application may also present, on the display(s) of the electronic device, a set of descriptors that the user can choose from to generate a prompt for the trained AI model(s). For example, the application may receive an indication of a selected descriptor(s) of the set of descriptors, and the application may generate prompt data representing a prompt based at least in part on the selected descriptor(s). In some examples, the electronic device sends the first image data and the prompt data to a server computer(s). In some examples, the server computer(s) can utilize one or more trained AI models to generate second image data based at least in part on the first image data and the prompt data, the second image data representing an AI-generated image(s) with an AI-generated background(s). In some examples, the server computer(s) uses a first trained AI model to generate an image map based at least in part on the first image data received from the electronic device, and a second trained AI model to generate the second image data based at least in part on the image map and the prompt data. In this example, the image map generated by the first trained AI model constrains what the second trained AI model is permitted to do while generating the second image data, which, in turn, mitigates undesired artifacts in the second image data, as described in more detail below. The electronic device can receive the second image data from the server computer(s), and, based at least in part on the second image data, the application executing on the electronic device can present, on the display(s) of the electronic device, a candidate image(s) with the AI-generated background(s) for selection by the user. Although the example above describes data being sent from the electronic device to a server computer(s), it is to be appreciated that the techniques described herein may be implemented without a server computer. For instances, the trained AI model(s) may be hosted by the electronic device of the user, and/or the operations described above as being performed by the server computer(s) may be performed by the electronic device (e.g., by the application executing thereon), in some examples.

In an illustrative example, a user may want to sell an item to customers via an ecommerce platform. For instance, the user may be associated with (e.g., an employee of) a merchant with an inventory of items, and the user may be tasked with creating an image of a new item so that the item can be added to an electronic catalogue of the merchant. In this example, the user may set the item on a table or a desk in their environment, open an application on their electronic device (e.g., a tablet computer), and capture an image(s) of the item using the application, which has access to a camera(s) of the electronic device. Initially, the captured image(s) may exhibit a real-world background, such as real objects and/or scenery behind the item, and within the field-of-view of the camera(s), at the time the image(s) is captured. The application can then obtain first image data that identifies the real-world background in the image. In order to generate an image(s) with an AI-generated background(s) substituted for the real-world background, the application may cause a set of descriptors to be presented on the display(s) of the electronic device. These descriptors may be, for example, words or phrases indicative of a type of scenery in which the item is to be featured in the AI-generated image(s). Upon receiving an indication of a selected descriptor(s) chosen by the user, the application may generate, based at least in part on the selected descriptor(s), prompt data representing a prompt, and the electronic device can send at least this prompt data and the first image data to a server computer(s). In response to sending the prompt data and the first image data to the server computer(s), the electronic device may receive, from the server computer(s), second image data output by a trained AI model(s). The received second image data may represent an AI-generated image(s) with an AI-generated background(s). Based at least in part on the second image data, the application can cause a candidate image(s) with the AI-generated background(s) to be presented on the display(s) of the electronic device, and the user can select a candidate image and take an action(s) with respect to the selected candidate image. In the running example, the user may request, via the application, to add the item to the electronic catalogue such that the selected candidate image (or an image generated by further processing the selected candidate image) can be featured in the electronic catalogue. In this manner, customers browsing and/or searching the electronic catalogue on the ecommerce platform can view the image of the item with the AI-generated background before making a purchase decision.

The techniques, devices, and systems described herein allow one or more computing devices to generate accurate and realistic backgrounds in images of items without human intervention. Conventional image-editing tools (e.g., image-editing software) have been used to produce edited images, but these edited images often fail the "believability test" in that a viewing user can readily recognize that the image has been altered. In order to produce edited images that pass the believability test, a human image-editing expert must perform painstaking, manual editing operations on an image using image-editing tools. The techniques, devices, and systems described herein improve computer-related technology by using one or more trained AI models to generate AI-generated backgrounds for images of items in a way that passes the believability test, and without requiring painstaking, manual editing operations to achieve a similar result. For example, the following disclosure provides techniques for training AI model(s), as well as techniques for preprocessing a captured image(s) of an item before the trained AI model(s) is/are used. These disclosed techniques allow for obtaining realistic-looking images of items with AI-generated backgrounds. That is, the techniques, devices, and systems described herein allow for creating item imagery where an item is immersed within the AI-generated background, with realistic-looking lighting and shadows applied to the item, which makes the imagery look realistic to a viewing user in that the viewing user cannot tell that the imagery was generated using AI.

In some examples, the techniques, devices, and systems described herein allow one or more computing devices to conserve resources with respect to processing resources, memory resources, networking resources, power resources, etc., in the various ways described herein. For example, a captured image(s) of an item may be cropped, and/or a trained AI model(s) may analyze the captured (e.g., cropped) image(s) of the item to generate a segmented image at a lower resolution than the resolution of the captured image(s). These exemplary techniques reduce the amount of pixel data that is stored and/or processed in order to generate an image of the item with an AI-generated background. This, in turn, conserves resources (e.g., memory resources, processing resources, etc.) of one or more computing devices (e.g., the electronic device of the user). For example, resources (e.g., memory resources, processing resources, etc.) of the electronic device can be conserved when the electronic device preprocesses a captured image(s) of an item before the trained AI model(s) is/are used to generate the AI-generated background disclosed herein because the electronic device processes and/or stores less pixel data than without implementing the techniques disclosed herein. These resource conservation measures allow a trained AI model(s) that is usable for segmenting the captured image (described in more detail below) to run on the electronic device (e.g., a mobile phone, a tablet computer, etc.) with constrained resources.

The techniques, devices, and systems described herein allow for creating professional-grade images of items (e.g., professional-grade product photography) without requiring a photographer, let alone travelling to a destination for a photo shoot and/or staging a scene in a photography studio. Instead, a user can conveniently "bring their images to life" from their current location using an electronic device with an application installed thereon. For example, a user may be in possession of an item within their home or office where they work. In this example, the user can use their electronic device (with the application executing thereon) to take a picture(s) of the item at their current location, and with minimal user input via the application, the user can create an image(s) of the item with an AI-generated background(s), all without leaving the comfort of their home or office. Accordingly, the techniques, devices, and systems automate a traditionally manual photo-staging-and-capture process, thereby eliminating the need for a human(s) to travel to a destination and stage the item for a photo shoot.

In examples where an item is to be offered for sale to customers via an ecommerce platform, the techniques, devices, and systems described herein allow for streamlining the process of featuring the item on the ecommerce platform. For example, a merchant can use the techniques, devices, and systems disclosed herein to conveniently capture images of items from anywhere (e.g., from the comfort of their home, office, etc.) and post the resulting images (e.g., images with AI-generated backgrounds) to the ecommerce platform (e.g., by featuring the images in an electronic catalogue of a merchant) using just their electronic device with an application installed thereon. This enables users (e.g., employees of merchants) to more-efficiently create item detail pages on an ecommerce website and/or on a mobile application by saving the merchant time, money, and effort in the process of adding items to an ecommerce platform.

The preceding summary is provided for the purposes of summarizing some example embodiments to provide a basic understanding of aspects of the subject matter described herein. Accordingly, the above-described features are merely examples and should not be construed as limiting in any way. Other features, aspects, and advantages of the subject matter described herein will become apparent from the following description of the Figures and Claims.

FIG. 1 is an example environment 100 for generating images of items with AI-generated backgrounds, according to an implementation of the present subject matter. As depicted, the example environment 100 may include users, such as the user 102. The user 102 may be associated with one or more electronic devices, such as the electronic device 104. The electronic device 104 may be configured to execute browsers and/or applications thereon, such as the application 106 (sometimes referred to herein as a "product photography application" 106). In some examples, the application 106, when executing on the electronic device 104, may allow the user 102 to interact with or access services, such as a product photography service 108. In some examples, user interfaces may be displayed (e.g., via the application 106) on the display(s) of the electronic device 104 to implement the techniques described herein, and the user 102 can interact with those user interfaces, as described in more detail below. In some examples, a service provider of the product photography service 108 may implement a computing platform 110 that, among other things, is configured to generate images of items with AI-generated backgrounds based at least in part on data received from electronic devices, such as the electronic device 104, as described in more detail below.

As depicted by FIG. 1, the electronic device 104 and computing platform 110 may be communicatively coupled via one or more network(s) 112, such as a wide area network (WAN) (e.g., the Internet, a cellular network, etc.). In some examples, the computing platform 110 may be implemented as one or more server computers (or servers). In some examples, the computing platform 110 may include a cloud-based computing architecture suitable for hosting and servicing sessions and/or instances of the application 106 executing on electronic devices, such as the electronic device 104, in order to implement the techniques described herein. In particular examples, the computing platform 110 may include a Platform as a Service (PaaS) architecture, a Software as a Service (Saas) architecture, an Infrastructure as a Service (IaaS), a Data as a Service (DaaS), a Compute as a Service (CaaS), or other similar cloud-based computing architecture (e.g., "X" as a Service (XaaS)).

The computing platform 110 may be configured to provide processing or computing support for the product photography service 108 and/or for instances of the application 106 executing on electronic devices, such as the electronic device 104. One or more servers of the computing platform 110 may have access to one or more data stores 114. The data store(s) 114 may include, for example, one or more internal data stores that may be utilized to store data associated with items, users, and/or merchants. For example, as shown in FIG. 1, the data store(s) 114 may be used to maintain image data 116 (e.g., images of items, images captured by electronic devices, training images used for training AI models, etc.), merchant data 118 (e.g., catalogue data associated with electronic catalogues of merchants), and/or user data 120 (e.g., user interaction data relating to interactions of users with images, descriptors, etc.), among other data and/or data structures described herein.

In the example of FIG. 1, the user 102 may represent an individual who desires to sell an item 122 on an ecommerce platform, such as an ecommerce website and/or mobile application. In some examples, the user 102 may not be associated with a merchant. Accordingly, this example user 102 may desire to offer the item 122 for sale on an ecommerce platform designed for independent sellers. In some examples, the user 102 is associated with (e.g., an employee or contractor of) a merchant that has an inventory of items. This example user 102 may be tasked with creating an image of the item 122 so that the item 122 can be added to the merchant's electronic catalogue, which is accessible by customers who can browse, search for, and purchase items from the merchant, and possibly from other merchants, via an ecommerce platform.

In the example of FIG. 1, the user 102 can download the application 106 from the computing platform 110 onto their electronic device 104. Once the application 106 is downloaded to the electronic device 104, the user 102 can open the application 106, and the application 106 starts executing on the electronic device 104. A first user interface 124(1) of the application 106 may present, on the display(s) of the electronic device 104, a live camera view 126 of the camera(s) of the electronic device 104. In some examples, the user 102 may select an option via the application 106 to invoke the live camera view 126 via the first user interface 124(1). While the live camera view 126 is presented on the display(s) of the electronic device 104, the user 102 can point the camera(s) of the electronic device 104 at the item 122 to capture an image(s) of the item 122 using the camera(s). In some examples, the user 102 may set the item 122 on a table or a desk in their environment, and/or the user 102 may orient the electronic device 104 relative to the item 122 such that the item 122 is within a viewfinder 128 presented on the first user interface 124(1). In the example of FIG. 1, the user 102 can select a shutter element 130 presented on the first user interface 124(1) to capture an image(s) of the item 122 from any desired angle or vantage point. In some examples, a single image of the item 122 is captured in response to a selection of the shutter element 130. In some examples, multiple images (e.g., a series of frames of a video) of the item 122 are captured in response to a selection(s) of the shutter element 130. Multiple captured images may provide more information about the item 122 (e.g., images of the item 122 from slightly different angles, and/or with slightly different lighting), which, in turn, may result in a higher-fidelity candidate images. By contrast, a single captured image may conserve computing resources (e.g., memory resources, processing resources, etc.) of one or more computing devices and may still result in candidate images with suitable fidelity.

Initially, the captured image(s) of the item 122 may exhibit a real-world background depicting objects and/or scenery behind the item 122, and within the field-of-view of the camera(s) of the electronic device 104, at the time of capturing the image(s) of the item 122. In the example of FIG. 1, the captured image(s) of the item 122 may exhibit a real-world background that includes part of a desk, a laptop computer, wires, and a wall(s) behind the item 122. In some examples, upon capturing the image(s) of the item 122, the application 106 may obtain first image data 116(1). In some examples, the first image data 116(1) identifies the real-world background in the captured image(s) of the item 122, as described in more detail below. This can allow for, among other things, substituting an AI-generated background for the real-world background in the captured image(s) of the item 122. In some examples, the first image data 116(1) can include an image of the item 122 itself, without the real-world background, and potentially with studio lighting (e.g., AI-generated lighting) applied to the item 122, as described in more detail below.

In the example of FIG. 1, after capturing the image(s) of the item 122, a second user interface 124(2) of the application 106 may present, on the display(s) of the electronic device 104, a set of descriptors 132. Each descriptor in the set of descriptors 132 can be a word or multiple words (e.g., a phrase). The set of descriptors 132 is sometimes referred to herein as a "word cloud" 132. It is to be appreciated that the set of descriptors 132 can be presented in any suitable format, such as a list of interactive elements, a grouping of interactive elements, or the like. In some examples, the user 102 can scroll (e.g., up, down, left, and/or right) through the set of descriptors 132 presented on the second user interface 124(2) to browse the available descriptors, and the user 102 can select one or more descriptors in the set of descriptors 132 to generate a prompt for a trained AI model(s) 134 hosted by the computing platform 110, as illustrated in FIG. 1. In the example of FIG. 1, the application 106 may receive an indication of a selected descriptor(s) (e.g., the selected descriptor, "Cliff") of the set of descriptors 132, and the application 106 may subsequently receive an indication that the user 102 has selected a generate element 136 on the second user interface 124(2). In response to receiving the indication of the selected descriptor(s) and the subsequent selection of the generate element 136, the application 106 may generate prompt data 138. The prompt data 138 may be generated based at least in part on the selected descriptor(s) (e.g., the selected descriptor, "Cliff"), and the prompt data 138 may represent a prompt for a trained AI model(s) 134.

In the example of FIG. 1, the electronic device 104 sends at least the first image data 116(1) and the prompt data 138 to a server computer(s) of the computing platform 110, and the server computer(s) receives the first image data 116(1) and the prompt data 138 from the electronic device 104 over the network(s) 112. A background generator component 140 of the product photography service 108 may be configured to, among other things, use one or more trained AI models 134 to generate, based at least in part on the first image data 116(1) and the prompt data 138, one or more AI-generated backgrounds, which can be used as a substitute for the real-world background in the captured image(s) of the item 122.

In some examples, the AI models described herein can be, or include, machine learning models. Machine learning generally involves processing a set of examples (called "training data" or a "training dataset") in order to train a machine learning model(s). A machine learning model(s), once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). In some examples, the disclosed AI models are generative AI models (e.g., generative adversarial network (GAN) models, diffusion models, etc.) that receive prompt data (e.g., text data, image data, audio data, or the like) to generate output data (e.g., image data, text data, audio data, or the like). In the context of the present disclosure, the input to the trained AI model(s) 134 may include at least the first image data 116(1) and the prompt data 138 (e.g., text data), and the trained AI model(s) 134 may be tasked with outputting image data, such as the second image data 116(2) shown in FIG. 1. The second image data 116(2) may represent one or more AI-generated images with one or more AI-generated backgrounds.

The AI model(s) 134 (e.g., trained machine learning model(s)) used by the background generator component 140 may represent a single model or an ensemble of base-level AI models, and may be implemented as any type of AI model. For example, suitable AI models 134 for use with or by the techniques and systems described herein include, without limitation, neural networks (e.g., deep neural networks (DNNs), recurrent neural networks (RNNs), GANs, etc.), diffusion models, tree-based models (e.g., eXtreme Gradient Boosting (XGBoost) models), support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), multilayer perceptrons (MLPs), expectation maximization, genetic algorithms, linear regression algorithms, nonlinear regression algorithms, logistic regression-based classification models, or an ensemble thereof. An "ensemble" can comprise a collection of AI models 134 whose outputs (predictions) are combined, such as by using weighted averaging or voting. The individual AI models of an ensemble can differ in their expertise, and the ensemble can operate as a committee of individual AI models that is collectively "smarter" than any individual AI model of the ensemble.

In some examples, the background generator component 140 uses at least two trained AI models 134 to generate the second image data 116(2). For example, a first trained AI model 134 can be used to generate an image map based at least in part on the first image data 116(1) received from the electronic device 104, and a second trained AI model 134 can be used to generate the second image data 116(2) based at least in part on the image map and the prompt data 138. In this example, the image map is used to constrain what the second trained AI model 134 is permitted to do during the process of generating the second image data 116(2), which, in turn, mitigates undesired artifacts in the second image data 116(2). For example, by using the image map to constrain the second trained AI model 134, the second trained AI model 134 may be less likely to generate artifacts on and/or around the item 122 within the second image data 116(2).

As shown in FIG. 1, a server computer(s) of the computing platform 110 may send the second image data 116(2) to the electronic device 104, and the electronic device 104 may receive the second image data 116(2) from the server computer(s) over the network(s) 112. Based at least in part on the second image data 116(2), a third user interface 124(3) of the application 106 may present, on the display(s) of the electronic device 104, one or more a candidate images 142 with the AI-generated background(s) for selection by the user 102 of the electronic device 104. In some examples, the second image data 116(2) generated by the trained AI model(s) 134 represents multiple AI-generated images with different AI-generated backgrounds. Example techniques for generating multiple, different AI-generated backgrounds to provide a variety of options to the user 102 are described in more detail below. In the example of FIG. 1, the third user interface 124(3) presents at least a first candidate image 142(1) and a second candidate image 142(2). In some examples, the user 102 can scroll (e.g., up, down, left, and/or right) through the candidate images 142 to review additional candidate images 142 and choose one of the candidate images 142. In the example of FIG. 1, the user 102 has selected the first candidate image 142(1), which depicts the item 122 (e.g., a shoe) immersed in an AI-generated background that includes a cliff (because the user 102 selected the descriptor, "Cliff"). For instance, the item 122 (e.g., shoe) is depicted as resting on a cliff, and artificial lighting and shadows are applied to and/or around the item 122 in such a way that the candidate image 142(1) looks realistic to the viewing user (e.g., the user 102). In some examples, the third user interface 124(3) may present a save element 144 that, upon selection, causes the selected candidate image 142(1) to be saved in memory (e.g., memory of the electronic device 104, memory of the computing platform 110, such as the data store(s) 114, etc.) in association with the user 102 and/or an account (e.g., a user account, a merchant account, etc.) associated with the user 102. In some examples, the user 102 may be able to take one or more further actions with respect to the selected candidate image 142(1).

In the example of FIG. 1, a merchant catalogue component 146 of the product photography service 108 may be configured to, among other things, add the item 122 to an electronic catalogue, such as an electronic catalogue associated with a merchant, based on an indication that the user 102 has requested to add the item 122 to the electronic catalogue. For example, at least a portion of the merchant data 118 may be associated with an electronic catalogue of a merchant, and the user 102 may be able to request, via the application 106, to add the item 122 to the electronic catalogue of the merchant, which causes the merchant data 118 to be updated with item data associated with the item 122, the item data including, among other data, image data 116 representing the selected candidate image 142(1).

Figure 2:
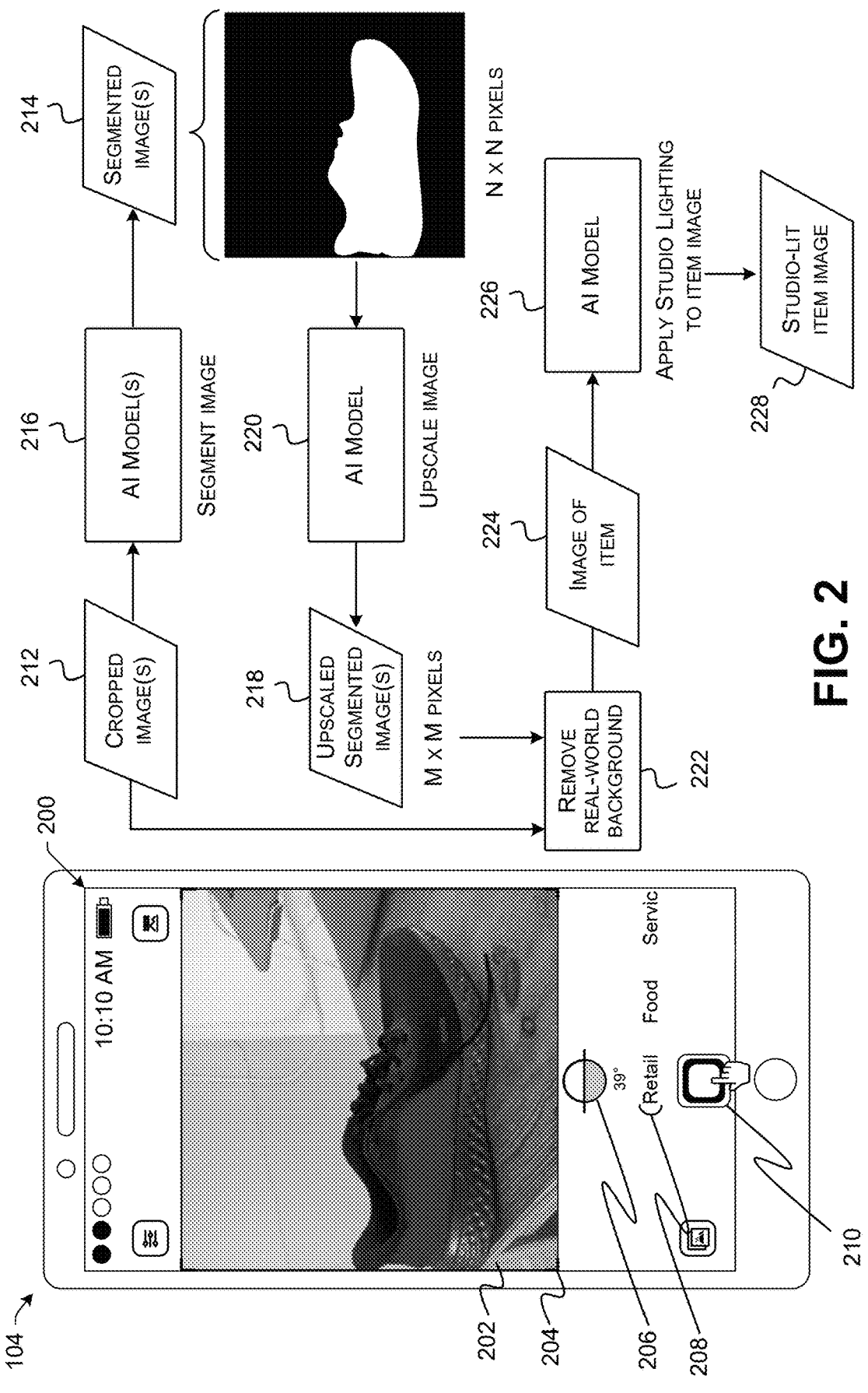
FIG. 2 is an example user interface for capturing an image of an item, and a technique for generating a preview image of the item with studio lighting applied thereto, according to an implementation of the present subject matter.

FIG. 2 is an example user interface 200 for capturing an image of an item 122, and a technique for generating a preview image of the item 122 with studio lighting applied thereto, according to an implementation of the present subject matter. In some examples, the user interface 200 is a more-detailed representation of the first user interface 124(1) shown in FIG. 1. In some examples, the user interface 200 is presented by the application 106 executing on the electronic device 104 of the user 102 of FIG. 1. In some examples, the user interface 200 is presented by a browser, such as a web browser. The user interface 200 may be presented on the electronic device 104 at any suitable time, such as in response to the user 102 opening the application 106 on the electronic device 104 and/or in response to the user 102 selecting an option to capture an image(s) of an item 122. The example user interface 200 presents a live camera view 202 of the camera(s) of the electronic device 104, which may be similar to the live camera view 126 described above with reference to FIG. 1. The user 102 can point the camera(s) of the electronic device 104 at an item 122 in the user's 102 environment to capture an image(s) of the item 122 using the camera(s) of the electronic device 104. In some examples, the user 102 may set the item 122 on a table or a desk in their environment, and may orient the electronic device 104 relative to the item 122 such that the item 122 is within a viewfinder 204 presented on the user interface 200, which may be similar to the viewfinder 128 described above with reference to FIG. 1. In some examples, the viewfinder 204 is square-shaped. A square-shaped viewfinder 204 may facilitate downstream processing of the captured image of the item 122, such as by allowing the application 106 to crop the image(s) of the item 122 into a cropped image that is square-shaped, which, in turn, may facilitate downscaling the cropped image to a downscaled, square-shaped image with a number of pixels in the X dimension that is equal to the number of pixels the Y dimension.

In the example of FIG. 2, the user interface 200 presents multiple interactive elements including, without limitation, an orientation indicator element 206, one or more category selector elements 208, and a shutter element 210, which may be similar to the shutter element 130 described above with reference to FIG. 1. The orientation indicator element 206 may be configured to change in response to a change in the orientation of the electronic device 104. This provides feedback to the user 102 regarding an orientation of the electronic device 104 at a time when the user 102 is, or is about to, capture an image(s) of the item 122. The user 102 may be able to scroll (e.g., up, down, left, and/or right) through the category selector elements 208 to select a category for the item 122 that the user 102 is about to photograph. In this example, the user 102 may select the "Retail" category selector element 208 if the item 122 is, say, a shoe, as depicted in FIG. 2. If the item 122 is, say, a food item, the user 102 may select the "Food" category selector element 208. The category that is selected for the item 122 may facilitate object recognition in a downstream image processing step and/or adding the item 122 to an ecommerce platform in such a way that the item 122 is searchable by a category keyword and/or within a category that is browsable by customers. The shutter element 210, when selected, causes the camera(s) of the electronic device 104 to capture an image(s) of the item 122 from any desired angle or vantage point.

In the example of FIG. 2, the application 106 executing on the electronic device 104 may crop the captured image(s) of the item 122 to obtain a cropped image(s) 212 of the item 122. In some examples, the cropped image(s) 212 may include the portion of the captured image(s) that is within the viewfinder 204, and the cropped image(s) 212 may exclude a remainder of the captured image(s) that is outside of the viewfinder 204. The remaining blocks shown in FIG. 2 may represent preprocessing steps that are performed (e.g., by the application 106, by a server computer(s) of the computing platform 110, or a combination thereof) with respect to the cropped image(s) 212 (or the captured image(s) of the item 122, if the captured image(s) is not cropped) before the trained AI model(s) 134 is/are used to substitute an AI-generated background for the real-world background in the cropped (or captured) image(s) 212.

At least one of the preprocessing steps may include obtaining (e.g., by the application 106, by a server computer(s) of the computing platform 110, or a combination thereof) a segmented image(s) 214 that identifies a real-world background in the cropped (or captured) image(s) 212 (e.g., based on a segmentation of the cropped (or captured) image(s) 212 into a foreground and a background). In some examples, a trained AI model(s) 216 is used (e.g., by the application 106, by a server computer(s) of the computing platform 110, or a combination thereof) to generate the segmented image(s) 214 at a first resolution (e.g., N×N pixels, where N is any suitable integer) based at least in part on an analysis of the cropped (or captured) image(s) 212. An exemplary image segmentation model that is suitable for use as the trained AI model(s) 216 is U2Net. In some examples, the AI model(s) 216 is trained with customized training data (e.g., images of items (e.g., products) that are commonly offered for sale by merchants) in order to segment images of items, such as the item 122, with improved accuracy. In some examples, N=320 such that the trained AI model(s) 216 outputs the segmented image(s) 214 at a first resolution of 320×320 pixels. However, this is merely an example of the first resolution of the segmented image(s) 214, and it is to be appreciated that the cropped (or captured) image(s) 212 can be downscaled to any suitable resolution, including resolutions different than 320×320 pixels. Cropping the captured image and/or downscaling the cropped (or captured) image(s) 212 to a resolution of N×N pixels reduces the amount of pixel data that is stored and/or processed in order to generate an image of the item 122 with an AI-generated background. This, in turn, conserves resources (e.g., memory resources, processing resources, etc.) of one or more computing devices (e.g., the electronic device 104), and it allows the trained AI model(s) 216 to run on the electronic device 104 (e.g., a mobile phone, a tablet computer, etc.) with constrained resources. In some examples, the segmented image(s) 214 may have a first subset of pixels of a first color to identify the real-world background in the image(s) and a second subset of pixels of a second color to identify the item 122 in the image(s). In some examples, the segmented image(s) 214 is a grayscale image(s) such that the first color of the first subset of pixels is black (e.g., a black background) and the second color of the second subset of pixels is white (e.g., a white item 122 in the foreground), or vice versa. In some examples, the segmented image(s) 214 and/or the cropped (or captured) image(s) 212 is normalized, such as by multiplying each pixel value by a fixed bias value, resulting in a normalized image(s) with normalized pixel values, each normalized pixel value being within a range of 0 to 1, inclusive.

The preprocessing steps may further include upscaling the segmented image(s) 214 to obtain an upscaled segmented image(s) 218 at a second resolution of M×M pixels, where M is any suitable integer greater than N. In other words, the second resolution of M×M pixels is greater than the first resolution of N×N pixels. In some examples, a trained AI model(s) 220 is used (e.g., by the application 106, by a server computer(s) of the computing platform 110, or a combination thereof) to increase a resolution of the segmented image(s) 214 from the first resolution (e.g., N×N pixels) to a second resolution (e.g., M×M pixels) greater than the first resolution. An exemplary super-resolution model that is suitable for use as the trained AI model(s) 220 is Enhanced SRGAN (ESRGAN). In some examples, M=2048 such that the trained AI model(s) 220 outputs the segmented image(s) 218 at a second resolution of 2048× 2048 pixels. However, this is merely an example of the second resolution of the segmented image(s) 218, and it is to be appreciated that the segmented image(s) 214 can be upscaled to obtain an upscaled segmented image(s) 218 any suitable resolution, including resolutions different than 2048×2048 pixels. In some examples, the second resolution of M×M pixels matches (or is equal to) the original resolution of the cropped (or captured) image(s) 212. In some examples, the first image data 116(1) described above with reference to FIG. 1 represents, or includes, the segmented image(s) 218 at the second resolution (e.g., M×M pixels). In examples where a server computer(s) of the computing platform 110 performs some or all of the image segmentation operations described above, the first image data 116(1) described above with reference to FIG. 1 may represent the cropped image(s) 212 (or the captured image(s) of the item 122, if the captured image(s) is not cropped), and the server computer(s) may generate the segmented image(s) 218. The segmented image(s) 218 is sometimes referred to herein as a "mask."

In order to present a preview (e.g., a preview image) of the item 122 with studio lighting applied thereto, at block 222, the application 106 and/or a server computer(s) of the computing platform 110, in some examples, may combine (e.g., blend) the upscaled segmented image 218 (or mask) with the cropped (or captured) image(s) 212 to remove the real-world background from the cropped (or captured) image(s) 212, resulting in an image(s) 224 of the item 122 without the real-world background. In some examples, a trained AI model(s) 226 is used to apply studio lighting to the item 122 extracted from the cropped (or captured) image(s) 212 at block 222. The trained AI model(s) 226 may be trained on images of objects (e.g., items), some with studio lighting and some without studio lighting, in order to learn how to apply studio lighting to an item 122 in an image. Accordingly, the output of the trained AI model(s) 226 may be a preview image 228 of the item 122 with studio lighting (or AI-generated lighting) applied to the item 122 and without the real-world background This preview image 228 is labeled as a "studio-lit item image" 228 in FIG. 2. In some examples, the first image data 116(1) described above with reference to FIG. 1 represents, or includes, the studio-lit item image 228. In some examples, the first image data 116(1) may include the image(s) 224 of the item 122 without the real-world background and without the AI-generated lighting applied thereto. In some examples, the first image data 116(1) may include the lower resolution segmented image 214.

Figures 3, 4:
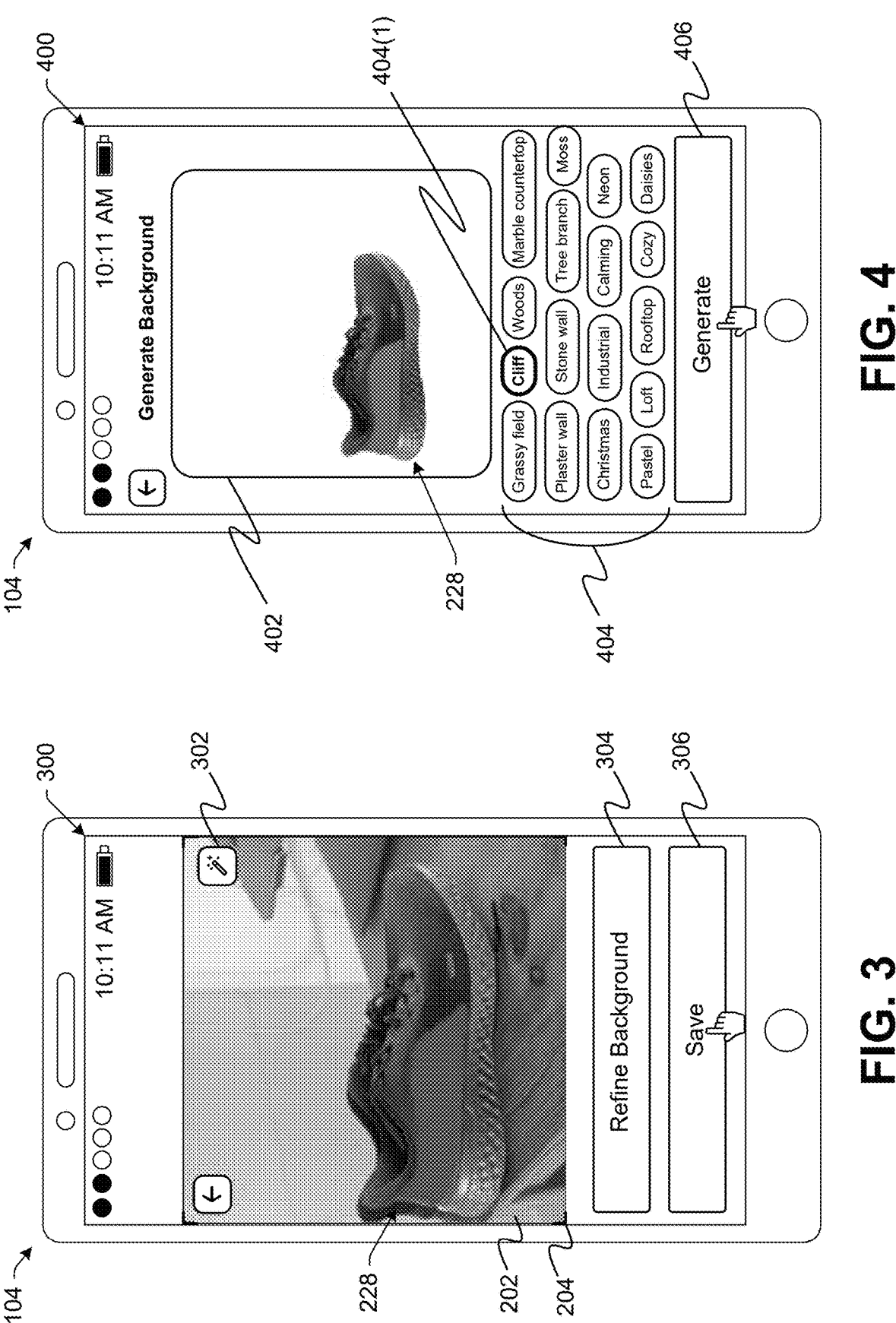
FIG. 3 is an example user interface for presenting a preview image of a studio-lit item and for allowing a user to modify the preview image, according to an implementation of the present subject matter.
FIG. 4 is an example user interface for adjusting a position, size, and/or orientation of the item within a frame, and for selecting a descriptor(s) that is to be used for generating a prompt for a trained AI model(s), according to an implementation of the present subject matter.

FIG. 3 is an example user interface 300 for presenting a preview image 228 of a studio-lit item 122 and for allowing a user 102 to modify the preview image 228, according to an implementation of the present subject matter. In some examples, the user interface 300 is presented by the application 106 executing on the electronic device 104 of the user 102 of FIG. 1. In some examples, the user interface 300 is presented by a browser, such as a web browser. The user interface 300 may be presented on the electronic device 104 at any suitable time, such as in response to the user 102 selecting the shutter element 210 on the user interface 200 in order to capture an image(s) of the item 122. The example user interface 300 presents the preview image 228 of the studio-lit item 122, which may have been generated as a result of performing one or more of the preprocessing steps described above with reference to FIG. 2. That is, the preview image 228 may be presented on the display(s) of the electronic device 104 based at least in part on the first image data 116(1), which may include the preview image 228. In some examples, the preview image 228 is overlaid on the live camera view 202 of the camera(s) of the electronic device 104 and within the viewfinder 204.

In the example of FIG. 3, the user interface 300 presents multiple interactive elements including, without limitation, a lighting toggle element 302, a refine background element 304, and a save element 306. Selection of the lighting toggle element 302 may toggle the studio lighting (or AI-generated lighting) on or off. For example, selection of the lighting toggle element 302 may toggle between presenting the preview image 228 of the item 122 (with studio lighting) and presenting the image 224 of the item 122 (without studio lighting). In this way, the user 102 can decide whether they prefer the an image of the item 122 with or without the studio lighting applied to the item 122. Selection of the refine background element 304 may allow the user 102 modify the preview image 228, such as by erasing pixels that the user 102 does not want to keep. For example, if the preview image 228 incidentally included pixels that are part of the real-world background in the cropped (or captured) image 212, the user 102 can interact with the preview image 228 to erase those unwanted pixels after selecting the refine background element 304. The user 102 may select the save element 306 to confirm that they want to feature the item 122 depicted in the preview image 228 in a final image, either with or without the studio lighting (or AI-generated lighting) applied to the item 122, depending on whether the user 102 toggled the studio lighting on or off via the toggle element 302. Accordingly, after the user 102 selects the save element 306, the application 106 may receive an indication of a confirmation from the user 102 to feature the item 122 depicted in the preview image 228 in a final image.

FIG. 4 is an example user interface 400 for adjusting a position, size, and/or orientation of the preview image 228 of the item 122 within a frame 402, and for indicating a descriptor(s) 404(1) that is to be used for generating a prompt for a trained AI model(s) 134, according to an implementation of the present subject matter. In some examples, the user interface 400 is a more-detailed representation of the second user interface 124(2) shown in FIG. 1. In some examples, the user interface 400 is presented by the application 106 executing on the electronic device 104 of the user 102 of FIG. 1. In some examples, the user interface 400 is presented by a browser, such as a web browser. The user interface 400 may be presented on the electronic device 104 at any suitable time, such as in response to the user 102 selecting the save element 306 on the user interface 300. In some examples, the user 102 may select an option to generate an AI-generated background between selection of the save element 306 and the display of the user interface 400. That is, in some examples, the user 102 may be presented with one or more options to generate backgrounds, including an option(s) to generate non-AI-generated backgrounds without the use of a trained AI model(s) 134. The example user interface 400 of FIG. 4 represents a user interface for using a trained AI model(s) 134 to generate an AI-generated background.

The example user interface 400 presents the preview image 228 of the studio-lit item 122 within a frame 402. In some examples, the user 102 can interact with the preview image 228 within the frame 402 to adjust a position, size, and/or orientation of the preview image 228 within a frame 402. For example, the user 102 may touch the display(s) of the electronic device 104 at a location of the preview image 228 and drag their finger while touching the display(s) to move the preview image 228 to a different position within the frame 402. Additionally, or alternatively, the user 102 may provide a pinch gesture on the display(s) of the electronic device 104 at a location of the preview image 228 to decrease the size of the preview image 228 within the frame 402, or the user 102 may provide a splay gesture on the display(s) of the electronic device 104 at a location of the preview image 228 to increase the size of the preview image 228 within the frame 402. Additionally, or alternatively, the user 102 may provide a two-fingered twisting gesture on the display(s) of the electronic device 104 at a location of the preview image 228 to rotate (e.g., in the X-Y plane parallel to the plane of the display(s)) the preview image 228 to a different orientation within the frame 402. If the user 102 decides to reposition, change the size of, or rotate/reorient the preview image 228 within the frame 402 by providing the corresponding gesture via the electronic device 104, the application 106 may receive an indication to reposition, resize, or rotate/reorient the preview image 228, and the application 106 may carry out the appropriate action to reposition, resize, or rotate/reorient the preview image 228 within the frame 402. The updated position, size, and/or orientation of the preview image 228 can then be presented on the user interface 400 within the frame 402 in response to the user-provided gesture(s).

In the example of FIG. 4, the user interface 400 presents additional interactive elements including, without limitation, a set of descriptors 404, which may be similar to the set of descriptors 132 described above with reference to FIG. 1, as well as a generate element 406, which may be similar to the generate element 136 described above with reference to FIG. 1. Each descriptor in the set of descriptors 404 can be a word or multiple words (e.g., a phrase). In some examples, the user 102 can scroll (e.g., up, down, left, and/or right) through the set of descriptors 404 (or the word cloud 404) presented on the user interface 400 to browse the available descriptors. It is to be appreciated that the user interface 400 shown in FIG. 4 is exemplary and that the user 102 can indicate one or more descriptors 404 via a user interface in other ways besides selecting from a set of descriptors 404 that is presented to the user 102 (e.g., the user 102 may drag and drop descriptors 404 from a list into a designated area on the user interface 400, the user 102 may type one or more words into a free-form text field to create their own descriptors, the user 102 may type a keyword(s) into a field and select an interactive element to suggest a descriptor(s), and the application 106 and/or a server computer(s) of the computing platform 110 may generate and display a descriptor(s) dynamically based on the keyword(s), etc.). However, it is to be appreciated that presenting a set of descriptors 404 to the user 102 may provide better (e.g., more reliable and/or consistent) results than allowing the user 102 to type any word(s) the user 102 desires to type into a free-form text field to generate a prompt for the trained AI model(s) 134. Furthermore, presenting descriptors that are too specific (e.g., "in a New York City library in front of a lamp") may yield worse results than the example descriptors 404 shown in FIG. 4, which include "Grassy field", "Cliff", "Woods", "Marble countertop", "Plaster wall", "Stone wall", "Tree branch", "Moss", "Christmas", "Industrial", "Calming", "Neon", "Pastel", "Loft", "Rooftop", "Cozy", and "Daisies." These are merely exemplary descriptors 404, yet they are illustrative of the level of specificity that tends to yield better (e.g., more reliable and/or consistent) results. In some examples, the set of descriptors 404 is determined dynamically. The dynamic determination of the set of descriptors 404 may be based on a type of the item 122 in the captured image(s). In some examples, a trained AI model(s) is used to determine a type of the item 122 in the captured image(s). For example, the captured image(s) of the item 122 may be provided as input to a trained AI model(s), and the trained AI model(s) may output a classification of the item 122 as one of multiple types of items (or item categories), such as jewelry, clothing, food, consumer electronics, or the like.

The user 102 can select one or more descriptors in the set of descriptors 404 to generate a prompt for a trained AI model(s) 134 hosted by the computing platform 110. In the example of FIG. 4, the application 106 may receive an indication of a selected descriptor(s) 404(1) (e.g., the selected descriptor 404(1), "Cliff") of the set of descriptors 404. The application 106 may subsequently receive an indication that the user 102 has selected the generate element 406 on the user interface 400. In response to receiving the indication of the selected descriptor(s) 404(1) and the selection of the generate element 406, the application 106 may generate prompt data 138. The prompt data 138 may be generated based at least in part on the selected descriptor(s) 404(1) (e.g., the selected descriptor 404(1), "Cliff"), and the prompt data 138 may represent a prompt for a trained AI model(s) 134.

Figure 5:
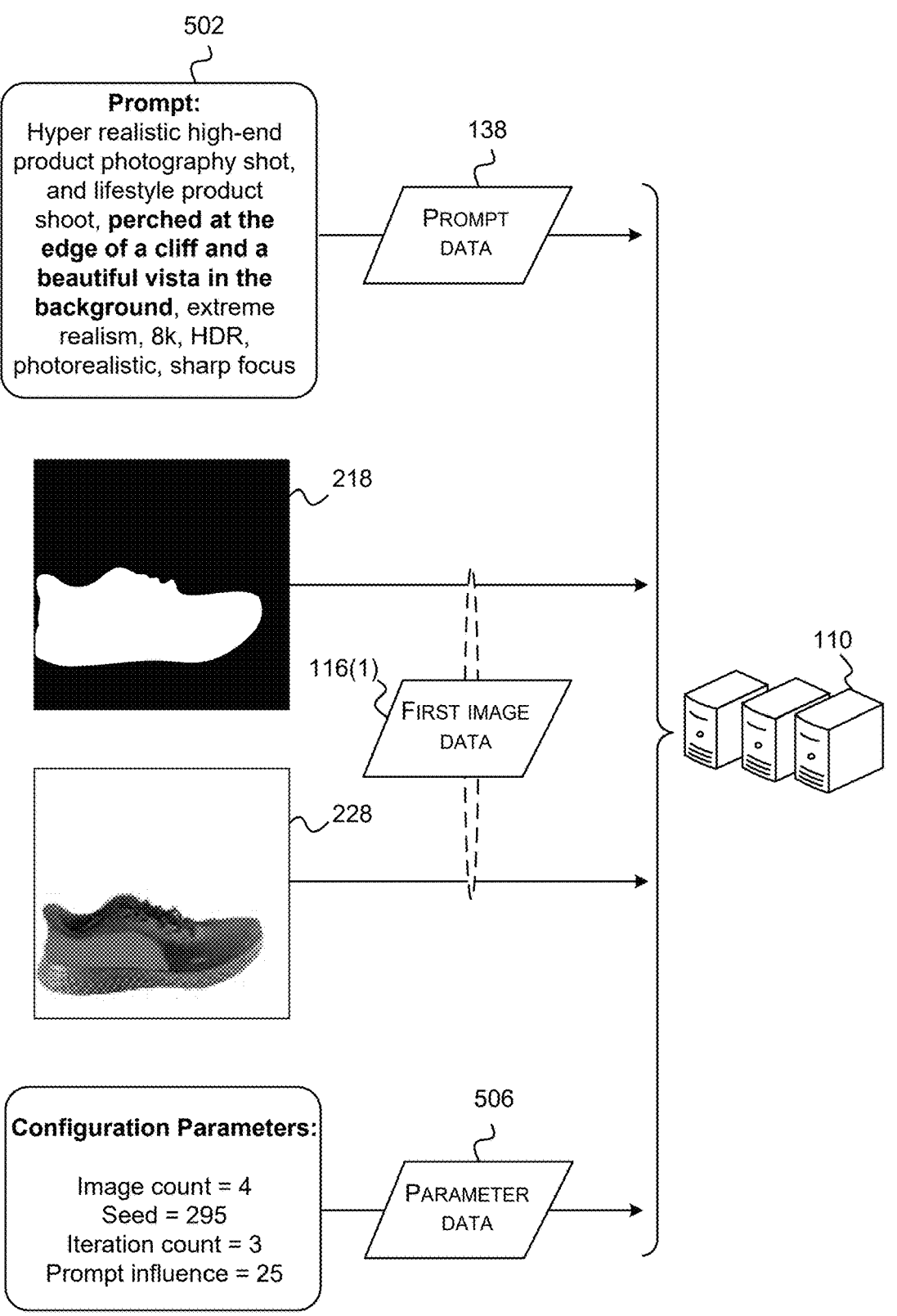
FIG. 5 is an example diagram illustrating example data that can be sent to a server computer(s) for generating one or more images with an AI-generated background(s), according to an implementation of the present subject matter.

FIG. 5 is an example diagram illustrating example data that can be sent to a server computer(s) of the computing platform 110 for generating one or more images with an AI-generated background(s), according to an implementation of the present subject matter. As discussed above with reference to FIG. 1, the electronic device 104 can send, to a server computer(s) of the computing platform 110, at least the prompt data 138 and the first image data 116(1). FIG. 5 illustrates an example of a prompt 502 that may be represented by the prompt data 138. In this example, the selected descriptor 404(1) is the word "Cliff," and the prompt 502, in this example, is the prompt "Hyper realistic high-end product photography shot, and lifestyle product shoot, perched at the edge of a cliff and a beautiful vista in the background, extreme realism, 8k, HDR, photorealistic, sharp focus." In this example, the prompt data 138 is generated based at least in part on a combination of a string of words and the selected descriptor 404(1). In the running example, the string of words includes the words in the prompt 502 other than the word "Cliff." Thus, to generate the prompt data 138, the application 106 may combine, concatenate, and/or append a string of words with/to the selected descriptor 404(1). In some examples, some, but not all, of the string of words are determined based at least in part on the selected descriptor 404(1). In the running example, the bolded portion of the prompt 502 shown in FIG. 5 (e.g., "perched at the edge of a . . . and a beautiful vista in the background") may be determined based at least in part on the selected descriptor 404(1). In this example, the application 106 may be configured to lookup a string of words in a database based at least in part on the selected descriptor 404(1). In some examples, the remainder of the string of words is static, and this static string of words is included across multiple prompts where the user 102 has selected different descriptors 404 for each of the multiple prompts. In the example of FIG. 5, the static portion of the string of words is the non-bolded portion of the prompt 502 (e.g., "hyper realistic high-end product photography shot, and lifestyle product shoot, . . . extreme realism, 8k, HDR, photorealistic, sharp focus"). This static portion of the string of words may help to provide a consistent aesthetic in the AI-generated images (e.g., a product photography aesthetic). In some examples, the string of words included in the prompt 502 may include as few as possible words about the item 122 itself and/or about cameras, which can help mitigate undesired artifacts in the second image data 116(2). Although the prompt data 138 is described as being generated by the application 106 executing on the electronic device 104, it is to be appreciated that the prompt data 138 can be generated by a server computer(s) of the computing platform 110, in some examples. That is, the selected descriptor 404(1) can be sent to the computing platform 110, in some examples, and the computing platform 110 may be configured to generate the prompt data 138 using the techniques described herein and/or using a trained AI model(s) 134 that is trained to generate prompt data 138 based on a selected descriptor(s) 404(1) provided as input to the trained AI model(s) 134.

As mentioned above, the first image data 116(1) may represent, or include, the segmented image(s) 218 (or mask) at the second resolution (e.g., M×M pixels) and/or the preview image 228 of the studio-lit item 122 without the real-world background. In some examples, the preview image 228 is within a frame 402 such that the first image data 116(1) identifies a position, a size, and/or an orientation of the preview image 228 within the frame 402 based on the user 102 having repositioned, resized, and/or reoriented the preview image 228 within the frame 402, as discussed above with reference to FIG. 4. That is, the first image data 116(1) may, in part, inform the background generator component 140 regarding the position, size, and/or orientation of the item 122 that the user 102 desires in the AI-generated image(s).

FIG. 5 further illustrates that the electronic device 104 can send parameter data 506 to a server computer(s) of the computing platform 110. The parameter data 506 may represent, or include, one or more parameter values. The parameter values may include, without limitation, in image count parameter value, a seed parameter value, an iteration count parameter value, and/or a prompt influence parameter value. The image count parameter value may be sent to the computing platform 110 to control the number of images the trained AI model(s) 134 generates. For example, if the image count parameter value is set to four, the second image data 116(2) output by the trained AI model(s) 134 will represent four AI-generated images with four different AI-generated backgrounds.

The seed parameter value may be sent to the computing platform 110 to cause the trained AI model(s) 134 to generate different AI-generated backgrounds in multiple AI-generated images, as opposed to generating the same AI-generated background in each of the multiple AI-generated images. For example, the background generator component 140 of the product photography service 108 may be configured to generate one or more additional seed parameter values (e.g., a second seed parameter value, a third seed parameter value, etc.) based at least in part on a first seed parameter value received from the electronic device 104. In some examples, the number of additional seed parameter values generated by the background generator component 140 is one less than the image count parameter value. For instance, if the image count parameter value is set to four, the background generator component 140 may generate three additional seed parameter values, such as a second seed parameter value, a third seed parameter value, and a fourth seed parameter value. In some examples, an individual seed parameter value may be set to a number within a range of 0 to 500. In some examples, the trained AI model(s) 134 that generates the second image data 116(2) uses the respective seed parameter values to determine where (e.g., in its latent space) to start generating each AI-generated image. By using a different seed parameter value to generate each AI-generated image, the trained AI model(s) 134 can generate multiple images with different AI-generated backgrounds instead of the same background in each of the multiple AI-generated images.

The iteration count parameter value may be sent to the computing platform 110 to control the number of iterations that the trained AI model(s) 134 runs through in order to produce its output (e.g., the second image data 116(2)). For example, the trained AI model(s) 134 may start from an image that is predominantly noise, and the trained AI model(s) 134 may progressively work towards generating a final image (e.g., an AI-generated image) over multiple iterations. Generally, the higher the iteration count parameter value, the higher the fidelity of the AI-generated image(s), although an iteration count parameter value that is too high may result in undesired artifacts because there may be a greater likelihood that the trained AI model(s) 134 will add undesired artifacts to the AI-generated image(s) if it has a greater number of iterations to run through in order to produce its output. A relatively low iteration count parameter value, on the other hand, may conserve resources and reduce latency (e.g., between the user 102 selecting the generate element 406 and the application 106 presenting candidate image(s) 142 on the display(s) of the electronic device 104), potentially at the cost of a lower fidelity AI-generated image(s).

The prompt influence parameter value (sometimes referred to herein as a "guidance parameter value") may be sent to the computing platform 110 to control a degree to which the trained AI model(s) 134 is to be influenced by the prompt data 138 to generate its output (e.g., the second image data 116(2)). In some examples, the prompt influence parameter value may be set to a number within a range of 0 to 30. A higher prompt influence parameter value may indicate that the trained AI model(s) 134 should adhere more closely to the prompt data 138, and a lower prompt influence parameter value may indicate that the trained AI model(s) 134 has more creative freedom to stray from the prompt data 138.

Figure 6:
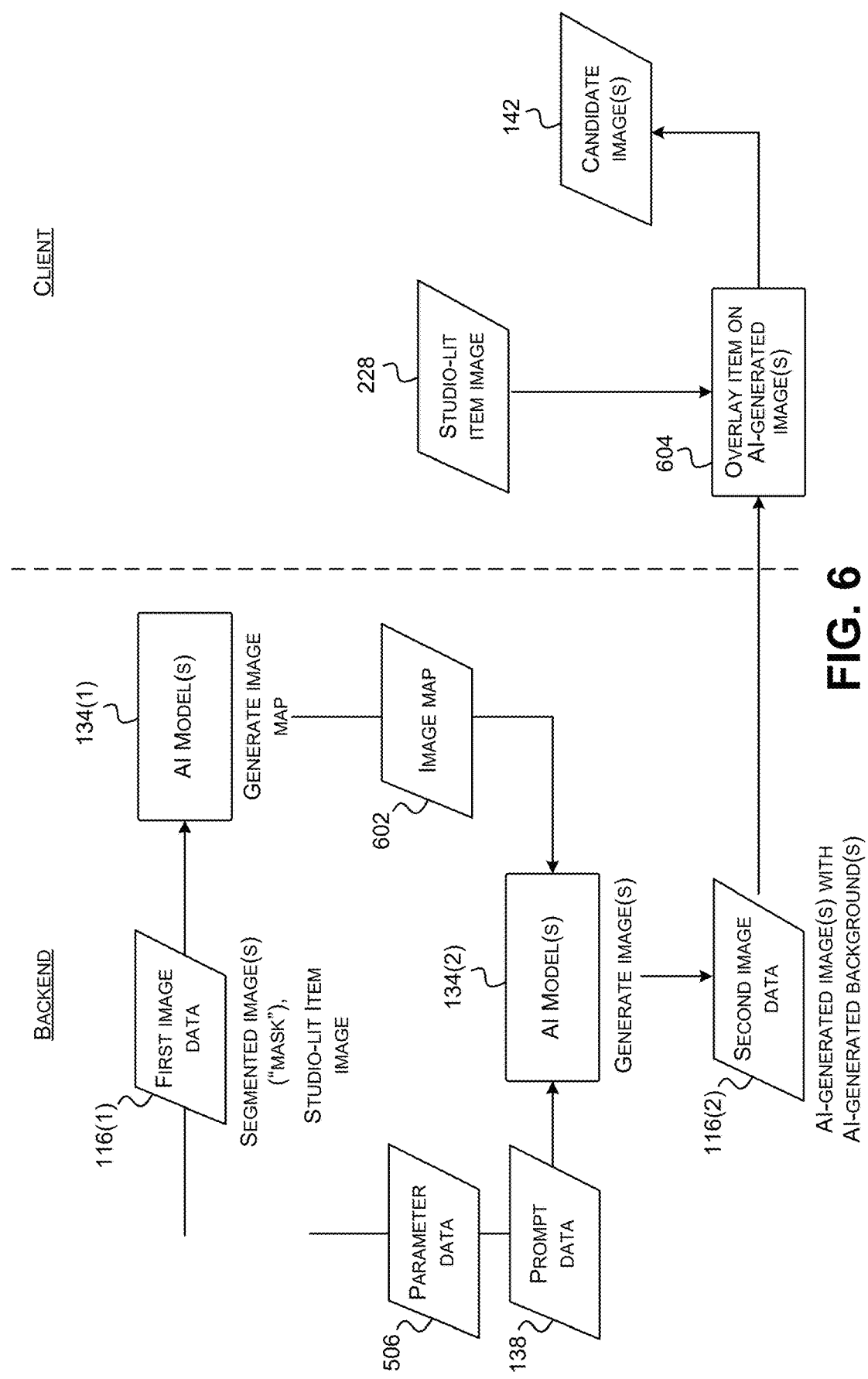
FIG. 6 is an example diagram illustrating an example technique for generating one or more images with an AI-generated background(s), and for overlaying, on a portion(s) of the image(s), an item extracted from an image captured by an electronic device of a user to obtain one or more candidate images featuring the item and the AI-generated background(s), according to an implementation of the present subject matter.

FIG. 6 is an example diagram illustrating an example technique for generating one or more images with an AI-generated background(s), and for overlaying, on a portion(s) of the image(s), an item 122 extracted from an image(s) captured by an electronic device 104 of a user 102 to obtain one or more candidate images 142 featuring the item 122 and the AI-generated background(s), according to an implementation of the present subject matter. The left side of FIG. 6, labeled "Backend," illustrates operations performed by a server computer(s) of the computing platform 110, and the right side of FIG. 6, labeled "Client," illustrates operations performed by an electronic device 104 of a user 102.

Starting with the Backend operations of FIG. 6, a server computer(s) of the computing platform 110 may receive, from an electronic device 104 of a user 102, the first image data 116(1), the prompt data 138, and/or the parameter data 506. The first image data 116(1) may, at least in part, identify a real-world background in an image of an item 122 captured using a camera(s) associated with the electronic device 104, as described above. In some examples, as mentioned above, the first image data 116(1) may represent, or include, the segmented image(s) 218 (or mask) at the second resolution (e.g., M×M pixels). In some examples, the first image data 116(1) may represent, or include, the preview image 228 of the studio-lit (or unlit) item 122 without the real-world background. As shown in FIG. 6, the server computer(s) may provide the first image data 116(1) as input to a first trained AI model(s) 134(1), and the first trained AI model(s) 134(1) may output an image map 602 (sometimes referred to herein as a "segmentation map" 602). An exemplary model that is suitable for use as the first trained AI model(s) 134(1) is ControlNet. As mentioned above, the image map 602 is used to constrain what the second trained AI model 134(2) is permitted to do during the process of generating the second image data 116(2), which, in turn, mitigates undesired artifacts in the second image data 116(2). For example, by using the image map 602 to constrain the second trained AI model 134(2), the second trained AI model 134(2) may be less likely to generate artifacts on the item 122 and/or around the item 122 within the second image data 116(2). Additionally, or alternatively, in order to mitigate undesired artifacts on and/or around the item 122 within the second image data 116(2), the application 106 executing on the electronic device 104 may add a margin around the item 122 depicted in the first image data 116(1) (e.g., by applying a Gaussian blur). This margin may discourage the second trained AI model(s) 134(2) from generating artifacts on and/or around the item 122.

The server computer(s) may provide the prompt data 138, the image map 602, and/or the parameter data 506 as input to the second trained AI model(s) 134(2), and the second trained AI model(s) 134(2) may output the second image data 116(2), which may represent one or more AI-generated images with one or more AI-generated backgrounds. An exemplary image generation model that is suitable for use as the second trained AI model(s) 134(2) is a diffusion model(s), such as Stable Diffusion. As described above, the prompt data 138 represents a prompt 502 for the second trained AI model(s) 134(2), and the second trained AI model(s) 134(2) generates the second image data 116(2) in accordance with the prompt 502. For example, the exemplary prompt 502 of FIG. 5 may cause the second trained AI model(s) 134(2) to generate second image data 116(2) representing an AI-generated image(s) with an AI-generated background(s) depicting outdoor/nature scenery with a cliff. The parameter data 506 may tell the second trained AI model(s) 134(2) how many AI-generated images to generate (e.g., based on the image count parameter value), where (e.g., in its latent space) to start generating each AI-generated image (e.g., based on the seed parameter value received from the electronic device 104 and possibly based on one or more additional seed parameter values generated by the server computer(s) based on the received seed parameter value), how many iterations to run through in order to produce its output (e.g., based on the iteration count parameter value), and/or a degree of influence the prompt data 138 should have on its output (e.g., based on the prompt influence parameter value). In some examples, the second image data 116(2) is generated using an "inpainting" process where the second trained AI model(s) 134(2) "fills in" the background with an AI-generated background to generate the second image data 116(2). It is to be appreciated, however, that the second trained AI model(s) 134(2) may generate pixels for the entire image(s) in the second image data 116(2) (e.g., pixels where the item 122 is positioned within the frame 402 and background pixels).

In some examples, Low-Rank Adaptation of Large Language Models (LoRA) is used to fine tune the second trained AI model(s) 134(2) based on proprietary/customized data associated with product photography. This can allow for more consistently generating second image data 116(2) with a product photography aesthetic. In general, a training dataset for training the AI models described herein can include two components: features and labels. However, the training dataset used to train the AI models (e.g., machine learning models) described herein may be unlabeled, in some embodiments. Accordingly, the AI models described herein may be trainable using any suitable learning technique, such as supervised learning, unsupervised learning, semi-supervised learning, reinforcement learning, and so on. The features included in the training dataset can be represented by a set of features, such as in the form of an n-dimensional feature vector of quantifiable information about an attribute of the training dataset. As part of the training process, weights may be set for machine learning. These weights may apply to a set of features included in the training data, as derived from historical data (e.g., previously collected image data 116) in the datastore 114. In some embodiments, the weights that are set during the training process may apply to parameters that are internal to the AI model(s) (e.g., weights for neurons in a hidden-layer of a neural network). These internal parameters of the AI model(s) may or may not map one-to-one with individual input features of the set of features. The weights can indicate the influence that any given feature or parameter has on the output of the trained AI model(s). During training of the models, a discriminator may be used to evaluate the performance of the model(s) in generating their output. Further, in some cases, the generation of the output (e.g., second image data 116(2)) can be responsive to a text input, audio/visual input, haptic input into a generative AI model.

Turning to the Client operations of FIG. 6, a server computer(s) of the computing platform 110 may send the second image data 116(2) to the electronic device 104 over the network(s) 112, and the electronic device 104 may receive the second image data 116(2) from the server computer(s). The application 106 executing on the electronic device 104 may, at block 604, obtain one or more candidate images 142 based at least in part on overlaying, on a portion(s) of the AI-generated image(s), the item 122 extracted from the cropped (or captured) image(s) 212 of the item 122. For example, the second image data 116(2) may represent multiple (e.g., four) different AI-generated images with different AI-generated backgrounds, and the application 106, at block 604, may overlay the item 122 (e.g., the preview image 228 of the studio-lit item 122 without the real-world background) onto a portion of each AI-generated image of the second image data 116(2). In some examples, the individual AI-generated images of the second image data 116(2) are of a first resolution (e.g., P×P pixels, where P is any suitable integer). In some examples, P=512 such that the trained AI model(s) 134(2) outputs the AI-generated image(s) at a first resolution of 512×512 pixels. In some examples, the application 106 may upscale the AI-generated image(s) from the first resolution of P×P pixels to a second resolution (e.g., M×M pixels) greater than the first resolution. In some examples, M=2048 such that the upscaled AI-generated image(s) are upscaled, by the application 106, to a second resolution of 2048×2048 pixels. The application 106, in this example, may overlay the preview image 228 of the studio-lit item 122 on respective portions of the AI-generated image(s) to create the candidate image(s) 142 at the second resolution of M×M pixels. The overlaying operation performed at block 604 can mitigate distortions that may occur during the diffusion process associated with the second trained AI model(s) 134(2).

Figure 7:
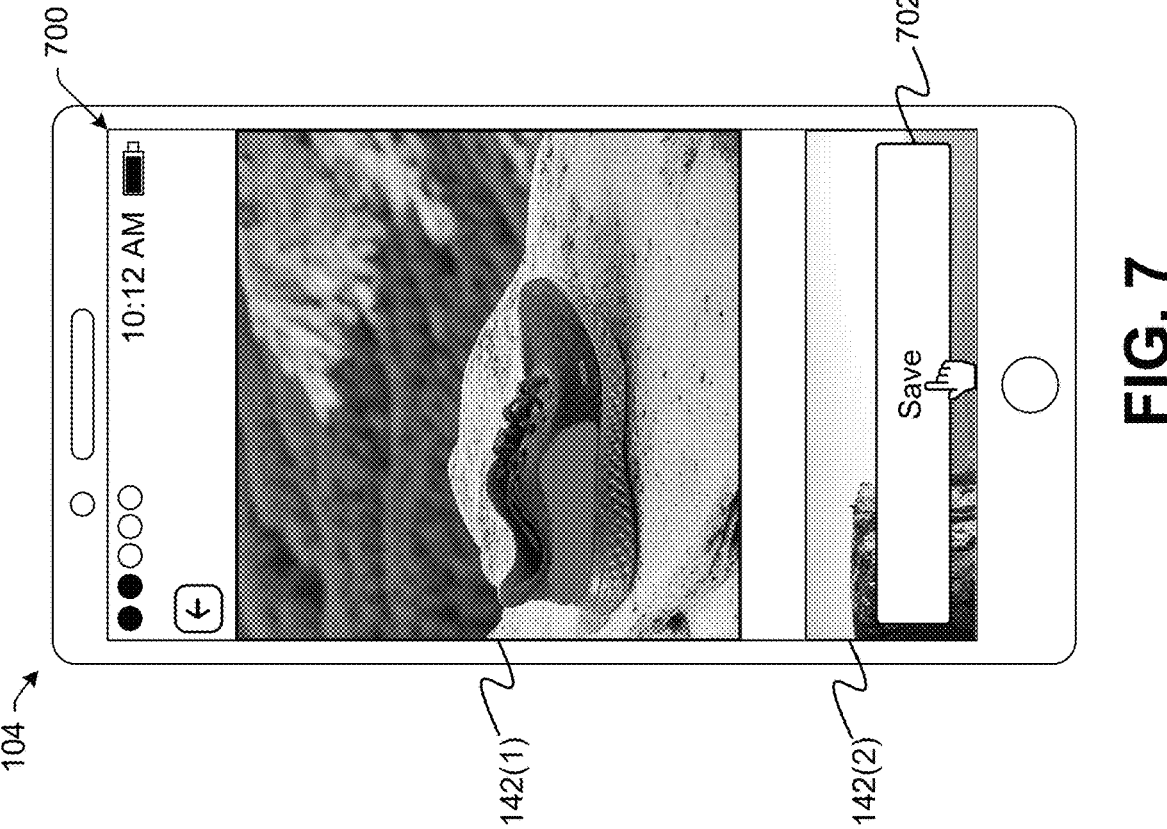
FIG. 7 is an example user interface for presenting one or more candidate images with AI-generated backgrounds for selection by a user of an electronic device, according to an implementation of the present subject matter.

FIG. 7 is an example user interface 700 for presenting one or more candidate images 142 with AI-generated backgrounds for selection by a user 102 of an electronic device 104, according to an implementation of the present subject matter. In some examples, the user interface 700 is a more-detailed representation of the third user interface 124 (3) shown in FIG. 1. In some examples, the user interface 700 is presented by the application 106 executing on the electronic device 104 of the user 102 of FIG. 1. In some examples, the user interface 700 is presented by a browser, such as a web browser. The user interface 700 may be presented on the electronic device 104 at any suitable time, such as in response to the electronic device 104 receiving the second image data 116(2) from the server computer(s) of the computing platform 110 and/or in response to the application 106 overlaying the item 122 on the AI-generated image(s) of the second image data 116(2). The example user interface 700 presents one or more a candidate images 142 with the AI-generated background(s) for selection by the user 102 of the electronic device 104. In some examples, the second image data 116(2) generated by the second trained AI model(s) 134(2) represents multiple AI-generated images with different AI-generated backgrounds. In the example of FIG. 7, the user interface 700 presents at least a first candidate image 142(1) and a second candidate image 142(2). In some examples, the user 102 can scroll (e.g., up, down, left, and/or right) through the candidate images 142 to review additional candidate images 142 and to choose one of the candidate images 142. In the example of FIG. 7, the user 102 has selected the first candidate image 142(1), which depicts the item 122 (e.g., a shoe) immersed in an AI-generated background that includes a cliff (because the user 102 selected the descriptor, "Cliff"). For instance, the item 122 (e.g., shoe) is depicted as resting on a cliff with lighting and shadows applied to and/or around the item 122 in such a way that the candidate image 142(1) looks realistic to the viewing user (e.g., the user 102). In some examples, the user interface 700 may present a save element 702, which may be similar to the save element 144 described above with respect to FIG. 1. Upon selection of the save element 702, the selected candidate image 142(1) may be saved in memory (e.g., memory of the electronic device 104, memory of the computing platform 110, such as the data store(s) 114, etc.). In some examples, the user 102 may be able to take further action(s) with respect to the selected candidate image 142 (1). An exemplary action that can be taken by the user 102 is shown in FIG. 8, which is discussed in more detail below.

Figure 8:
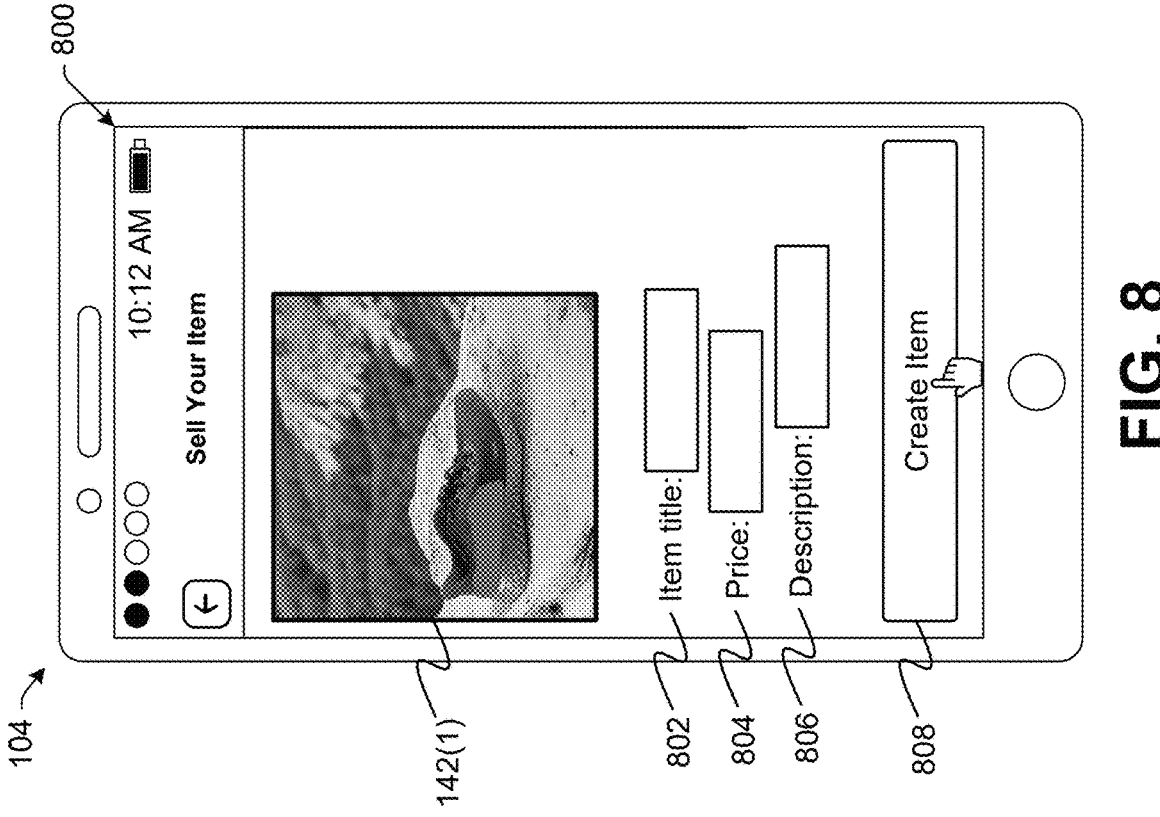
FIG. 8 is an example user interface for adding the item to an electronic catalogue, according to an implementation of the present subject matter.

FIG. 8 is an example user interface 800 for adding the item 122 to an electronic catalogue (e.g., an electronic catalogue associated with a merchant), according to an implementation of the present subject matter. In some examples, the user interface 800 is presented by the application 106 executing on the electronic device 104 of the user 102 of FIG. 1. In some examples, the user interface 800 is presented by a browser, such as a web browser. The user interface 800 may be presented on the electronic device 104 at any suitable time, such as in response to the user 102 selecting the save element 702 on the user interface 700. The example user interface 800 presents the selected candidate image 142(1) chosen by the user 102 from the user interface 700, as well as one or more fields for the user 102 to enter information about the item 122, such as an item title field 802, a price field 804, and a description field 806. The user 102 can specify a title (or name) of the item 122 in the item title field 802, a price of the item 122 in the price field 804, and a description of the item 122 in the description field 806. Once the user 102 has entered information into one or more of the fields 802-806, the user 102 can select the create item element 808 on the user interface 800, and, based on this selection, the application 106 receives an indication to add the item 122 to the electronic catalogue.

The merchant catalogue component 146 of the product photography service 108 may be configured to, among other things, add the item 122 to the electronic catalogue (e.g., an electronic catalogue associated with the merchant) based on an indication received from the application 106 that the user 102 has requested to add the item 122 to the electronic catalogue. For example, at least a portion of the merchant data 118 may be associated with an electronic catalogue of a merchant, and, based on the indication received from the application 106 (e.g., including the information input into the field(s) 802-806 by the user 102, the selected candidate image 142(1), etc.), the merchant data 118 can be updated with item data associated with the item 122, the item data including, among other data, image data 116 representing the selected candidate image 142(1), and item data corresponding to the information input into the field(s) 802-806.

The user interfaces 124, 200, 300, 400, 700, and 800 are provided as examples of user interfaces that can be presented to facilitate techniques described herein. User interfaces can present additional or alternative data in additional or alternative configurations. That is, user interfaces 124, 200, 300, 400, 700, and 800 should not be construed as limiting.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 9 is an example process 900 for presenting, on a display(s) of an electronic device 104 of a user 104, a candidate image(s) 142 with an AI-generated background(s), according to an implementation of the present subject matter. The process 900 can be implemented by a device or system including one or more processors and memory storing computer-executable instructions to cause the one or more processors to perform the process 900. In some examples, the process 900 can be implemented by the electronic device 104 described above. For discussion purposes, the process 900 is described with reference to the previous figures.

At 902, an image(s) of an item 122 is captured. The image(s) may be captured at block 902 by executing an application 106 on an electronic device 104 of a user 102 and using a camera(s) of the electronic device 104. An exemplary user interface of the application 106 for capturing the image(s) of the item 122 at block 902 is the user interface 200 shown in FIG. 2. As mentioned above, a single image, or multiple images, of the item 122 can be captured at block 902. Multiple images of the item 122 may provide more information about the item 122 that can facilitate object detection and other downstream processes. For example, multiple images by show different views of an object. In some examples, the captured image(s) of the item 122 is cropped to obtain a cropped image(s) 212.

At 904, first image data 116(1) is obtained based at least in part on the image(s) captured at block 902. In some examples, the application 106 obtains the first image data 116(1) at block 904. In some examples, the first image data 116(1) identifies a real-world background in the image(s) captured at block 902. In some examples, the first image data 116(1) is obtained at block 904 based on a segmentation of the image(s) captured at block 902. For example, the first image data 116(1) can represent a segmented image(s), such as the segmented image(s) 218 (or mask) described above with reference to FIG. 2.

In some examples, obtaining the first image data 116(1) at block 904 includes using a trained AI model(s) 216 to generate a segmented image(s) 214 at a first resolution (e.g., N×N pixels) based at least in part on an analysis of the image(s) captured at block 902. In this example, the segmented image(s) 214 may have a first subset of pixels of a first color (e.g., black) to identify the real-world background in the image(s) captured at block 902 and a second subset of pixels of a second color (e.g., white) to identify the item 122 in the image(s) captured at block 902. In some examples, obtaining the first image data 116(1) at block 904 further includes using another trained AI model(s) 220 to increase a resolution of the segmented image(s) 214 from the first resolution to a second resolution (e.g., M×M pixels) greater than the first resolution. In this example, the first image data 116(1) can represent, or include, the segmented image(s) 218 at the second resolution (e.g., M×M pixels), as described above with reference to FIG. 2.

In some examples, a trained AI model(s) 226 may be used to apply AI-generated lighting (or studio lighting) to the item 122 extracted from the image(s) captured at block 902. In some examples, a preview image 228 of the item 122 may be presented on the display(s) of the electronic device 104 via the application 106 based at least in part on the first image data 116(1). This preview image 228 may have AI-generated lighting applied to the item 122 and may exclude the real-world background. Accordingly, in some examples, the first image data 116(1) obtained at block 904 may represent, or include, the preview image 228 of the item 122. In some examples, the application 106 may receive an indication of a confirmation from the user 102 to feature the item 122 in a final image with the AI-generated lighting applied to the item 122. An example of providing such an indication is shown in FIG. 3 via the selection of the save element 306 on the user interface 300.

At 906, a user interface is presented on the display(s) of the electronic device 104 via the application 106, the user interface being for the user 102 to indicate one or more descriptors 404. In some examples, the presenting of the user interface at block 906 includes presenting a set of descriptors 404 (e.g., via the user interface and/or via the application 106) on the display(s) of the electronic device 104. The individual descriptors in the set of descriptors 404 may be selectable by the user 102 to substitute an AI-generated background for the real-world background in the image(s) captured at block 902. In some examples, the application 106 determine a type of the item 122 in the image(s), and determines the set of descriptors 404 based at least in part on the type of the item 122. In these examples, the application 106 can use a trained AI model(s) to determine a type of the item 122 in the image(s), and/or the application 106 can determine a type of the item 122 in the image(s) using an object recognition program(s) and/or pre-stored mappings between types of items and descriptors (e.g., a database of item type-to-descriptor mappings), and/or the application 106 can determine a type of the item 122 in the image(s) in other ways. It is to be appreciated that the set of descriptors 404 can be static, or dynamically determined, and that the set of descriptors 404 can be dynamically determined based on other factors in addition to, or in lieu of, the type of the item 122.

In some examples, a preview image 228 of the item 122 extracted from the image(s) captured at block 902 may be presented on the display(s) of the electronic device 104 via the application 106 and within a frame 402, as shown in FIG. 4. In some examples, the user 102 can manipulate the preview image 228 by repositioning, resizing, and/or reorienting the preview image 228. Accordingly, in some examples, the application 106 may receive an indication to at least one of reposition the preview image 228 within the frame 402, resize the preview image 228 within the frame 402, and/or reorient the preview image 228 within the frame 402. In some examples, the first image data 116(1) can be augmented with additional image data that identifies, based at least in part on this indication, at least one of a position of the item 122 within the frame 402, a size of the item 122 within the frame 402, and/or an orientation of the item 122 within the frame 402.

At 908, an indication of a descriptor(s) 404(1) is received via the user interface presented at block 906. In some examples, the indication received at block 908 includes an indication of a selected descriptor(s) 404(1) of a set of descriptors 404 presented at block 906 for selection by the user 102. In some examples, the application 106 receives user input indicating the selected descriptor(s) 404(1), such as a touch of a finger on the display(s) at a location of the selected descriptor(s) 404(1).

At 910, prompt data 138 representing a prompt 502 is generated based at least in part on the selected descriptor(s) 404(1). In some examples, the application 106 generates the prompt data 138. In some examples, the generating the prompt data 138 at block 910 is based at least in part on a combination of a string of words and the selected descriptor(s) 404(1), as described above with reference to FIG. 5. In some examples the application 106 may determine some, but not all, of the string of words based at least in part on the selected descriptor(s) 404(1), such as the portion of the string of words in bold in the prompt 502 shown in FIG. 5.

At 912, data is sent to a server computer(s). In some examples, the electronic device 104 sends the data to a server computer(s) of the computing platform 110 that hosts a trained AI model(s) 134. The data sent at block 912 can include, without limitation, the first image data 116(1), the prompt data 138, and/or parameter data 506. In some examples, the parameter data 506 may include, without limitation, an image count parameter value, a seed parameter value, an iteration count parameter value, and/or a prompt influence parameter value. The image count parameter value may control the number of images the trained AI model(s) 134 generates. The seed parameter value may be used by the server computer(s) to generate one or more additional seed parameter values that, in combination with the sent seed parameter value, cause the trained AI model(s) 134 to generate different AI-generated backgrounds in multiple AI-generated images, instead of generating a common AI-generated background for the multiple AI-generated images. The iteration count parameter value may control the number of iterations that the trained AI model(s) 134 runs through in order to produce its output. The prompt influence parameter value may indicate a degree to which the trained AI model(s) 134 is to be influenced by the prompt data 138.

At 914, second image data 116(2) output by the trained AI model(s) 134 is received from the server computer(s), the second image data 116(2) representing an AI-generated image(s) with an AI-generated background(s). In some examples, the electronic device 104 receives the second image data 116(2) from the server computer(s) at block 914. In some examples, a candidate image(s) 142 is obtained based at least in part on overlaying the item 122 extracted from the image(s) captured at block 902 (e.g., the preview image 228 of the studio-lit (or unlit) item 122) on a portion of the AI-generated image(s), the candidate image(s) 142 featuring the extracted item 122 and the AI-generated background(s), as described above with reference to FIG. 6. In some examples, the second image data 116(2) represents multiple AI-generated images with different AI-generated backgrounds, and multiple candidate images 142(1), 142(2), etc. are obtained based on overlaying the extracted item 122 on respective portions of the multiple AI-generated images, wherein the multiple candidate images 142(1), 142(2), etc. feature the extracted item 122 and the different AI-generated backgrounds. In some examples, obtaining the candidate image(s) 142 is based at least in part on upscaling the AI-generated image(s) to a higher resolution.

At 916, based at least in part on the second image data 116(2), the candidate image(s) 142 with the AI-generated background(s) is/are presented on the display(s) of the electronic device 104 via the application 106 for selection by the user 102 of the electronic device 104. In some examples, the multiple candidate images 142(1), 142(2), etc. with the different AI-generated backgrounds are presented for selection by the user 102 at block 916. In some examples, the application 106 upscales the selected candidate image to a higher resolution.

In some examples, user data 120 associated with the user 102 is collected (e.g., by the application 106) at block 916, or after block 916, the user data 120 indicating which of the multiple candidate images 142(1), 142(2), etc. the user 102 selected. In some examples, the collected user data 120 is sent to the server computer(s) to retrain the trained AI model(s) 134. Accordingly, user data 120 can be collected and used to improve the product photography service 108 over time by monitoring which of the candidate images 142 are selected by users, and utilizing a reinforcement mechanism to determine how to generate better images in the future based on the selected candidate images 142.

In some examples, an indication to add the item 122 to an electronic catalogue (e.g., an electronic catalogue associated with a merchant) is received at block 916, or after block 916. An example user interface via which this indication may be received is the user interface 800 of FIG. 8. Based at least in part on receiving this indication (e.g., based on a selection of the create item element 808 of the user interface 800), the selected candidate image 142(1) may be featured in the electronic catalogue. For example, the application 106 may cause the selected candidate image 142(1) to be featured in the electronic catalogue by sending the indication to the server computer(s), and the merchant catalogue component 146 may update the merchant data 118 (e.g., the merchant's electronic catalogue) with image data 116 representing the selected candidate image 142(1).

FIG. 10 is an example process 1000 for generating one or more images with AI-generated backgrounds, according to an implementation of the present subject matter. The process 1000 can be implemented by a device or system including one or more processors and memory storing computer-executable instructions to cause the one or more processors to perform the process 1000. In some examples, the process 1000 can be implemented by one or more server computers of the computing platform 110 described above. For discussion purposes, the process 1000 is described with reference to the previous figures.

At 1002, data is received from an electronic device 104 of a user 102. In some examples, the data is received at block 1002 by a server computer(s) of a computing platform 110 that implements a product photography service 108, as described above with reference to FIG. 1. The data received at block 1002 may include, without limitation, prompt data

138, first image data 116(1), and/or parameter data 506. The prompt data 138 may represent a prompt 502 for a trained AI model(s) 134. The first image data 116(1) may identify a real-world background in an image(s) of an item 122 captured using a camera(s) associated with the electronic device 104. For example, the first image data 116(1) can represent a segmented image(s), such as the segmented image(s) 218 (or mask) described above with reference to FIG. 2. In some examples, image segmentation may be performed by the server computer(s). In such an example, the first image data 116(1) can represent the cropped image(s) 212 (or the captured image(s) of the item 122, if the captured image(s) is not cropped), and the server computer(s) may, at block 1002, generate the segmented image(s) 218 (or mask) using the techniques described above (e.g., preprocessing steps described above with respect to FIG. 2). In some examples, the first image data 116(1) may represent, or include, a preview image 228 of the item 122 with (or without) AI-generated lighting applied to the item 122 and without the real-world background. In some examples, the server computer(s) may generate the preview image 228 of the item 122 with (or without) AI-generated lighting applied to the item 122 and without the real-world background. In such an example, the first image data 116(1) can represent the cropped image(s) 212 (or the captured image(s) of the item 122, if the captured image(s) is not cropped) and/or the segmented image(s) 218, and the server computer(s) may, at block 1002, generate the preview image 228 using the techniques described above (e.g., preprocessing steps described above with respect to FIG. 2). In some examples, the first image data 116(1) identifies at least one of a position of the item 122 within a frame 402, a size of the item 122 within the frame 402, and/or an orientation of the item 122 within the frame 402. As described above with reference to FIG. 4, this may be based on a manipulation of the preview image 228 within the frame 402 via the user interface 400 that occurred prior to receipt of the data at block 1002. The parameter data 506 may include, without limitation, an image count parameter value, a seed parameter value, an iteration count parameter value, and/or a prompt influence parameter value, as described above.

At 1004, an image map 602 is generated based at least in part on the first image data 116(1) and using a first trained AI model(s) 134(1). In some examples, the server computer(s) may provide the first image data 116(1) as input to the first trained AI model(s) 134(1), and the first trained AI model(s) 134(1) may output the image map 602. The image map 602 is used to constrain what a second trained AI model 134(2) is permitted to do during the process of generating one or more AI-generated images with one or more AI-generated backgrounds. This, in turn, mitigates undesired artifacts in the AI-generated image(s), as described above.

At 1006, a determination is made as to whether to generate additional seed parameter values. The determination at block 1006 may be based at least in part on the image count parameter value. For example, if the image count parameter value is set to an integer greater than one, the server computer(s) may determine, at block 1006, to generate one or more additional seed parameter values. Otherwise, if the image count parameter value is set to one, the server computer(s) may determine, at block 1006, to refrain from generating one or more additional seed parameter values. If it is determined to generate one or more additional seed parameter values, the process 1000 may follow the YES route from block 1006 to block 1008.

At 1008, one or more additional seed parameter values are generated based at least in part on the first seed parameter value. In some examples, the number of additional seed parameter values generated is one less than the image count parameter value. For example, if the image count parameter value is set to four, the server computer(s) may generate three additional seed parameter values at block 1008. Any suitable algorithm or function may be used to generate the additional seed parameter value(s) at block 1008, such as a random number generator.

At 1010, following block 1008, or following the NO route from block 1006, second image data 116(2) is generated using a second trained AI model(s) 134(2) based at least in part on the image map 602, the prompt data 138, and/or the parameter data 506 (e.g., including the received seed parameter value and the additional seed parameter value(s) generated at block 1008). The second image data 116(2) generated at block 1010 represents an AI-generated image(s) with an AI-generated background(s). In some examples, at block 1010, the second trained AI model(s) 134(2) may generate a number of AI-generated images in accordance with the image count parameter value. For example, if the image count parameter value is set to four, the second trained AI model(s) 134(2) generates four AI-generated images at block 1010. In some examples, the seed parameter values (e.g., the received seed parameter value and the additional seed parameter value(s)) cause the second trained AI model(s) 134(2) to generate different AI-generated backgrounds in multiple AI-generated images, instead of generating a common AI-generated background for the multiple AI-generated images. In some examples, at block 1010, the second trained AI model(s) 134(2) runs through a number of iterations to produce the second image data 116(2), the number of iterations dictated by the iteration count parameter value. In some examples, at block 1010, in generating the second image data 116(2), the degree to which the second trained AI model(s) 134(2) is influenced by the prompt data 138 is based on the prompt influence parameter value.

At 1012, the second image data 116(2) is sent to the electronic device 104 of the user 102. In some examples, the server computer(s) of the computing platform 110 sends the second image data 116(2) to the electronic device 104 for display of one or more candidate image(s) 142 on the display(s) of the electronic device 104 so that the user 102 can select one of the candidate images 142 with an AI-generated background.

The techniques, devices, and systems described herein allow for generating images with AI-generated backgrounds in a way that provides realistic immersion, lighting, and/or shadowing with respect to the item 122 featured in the AI-generated images in order to pass the believability test. This is at least in part due to the techniques described above for generating the prompt data 138, and/or due to the training and use of the AI model(s) described herein. In the AI-generated images, generated by the techniques, devices, and systems, described herein, the item 122 is grounded in the AI-generated background (e.g., a scene, an environment, etc.), making it look like the item 122 was actually in a real environment when an image of the item 122 was captured. For example, the item 122 may be nestled in the sand on a beach in a realistic-looking way. The lighting on and around the item 122 may also be consistent with how the item 122 is lit in the originally-captured image(s) (e.g., the image(s) captured by the user 102). The item 122 can also cast a shadow that makes it look like the item 122 is actually in a real environment (e.g., the item 122 is resting on a platform with a shadow cast behind the item 122 in a direction that is consistent with the angle of image capture).

Figure 11:
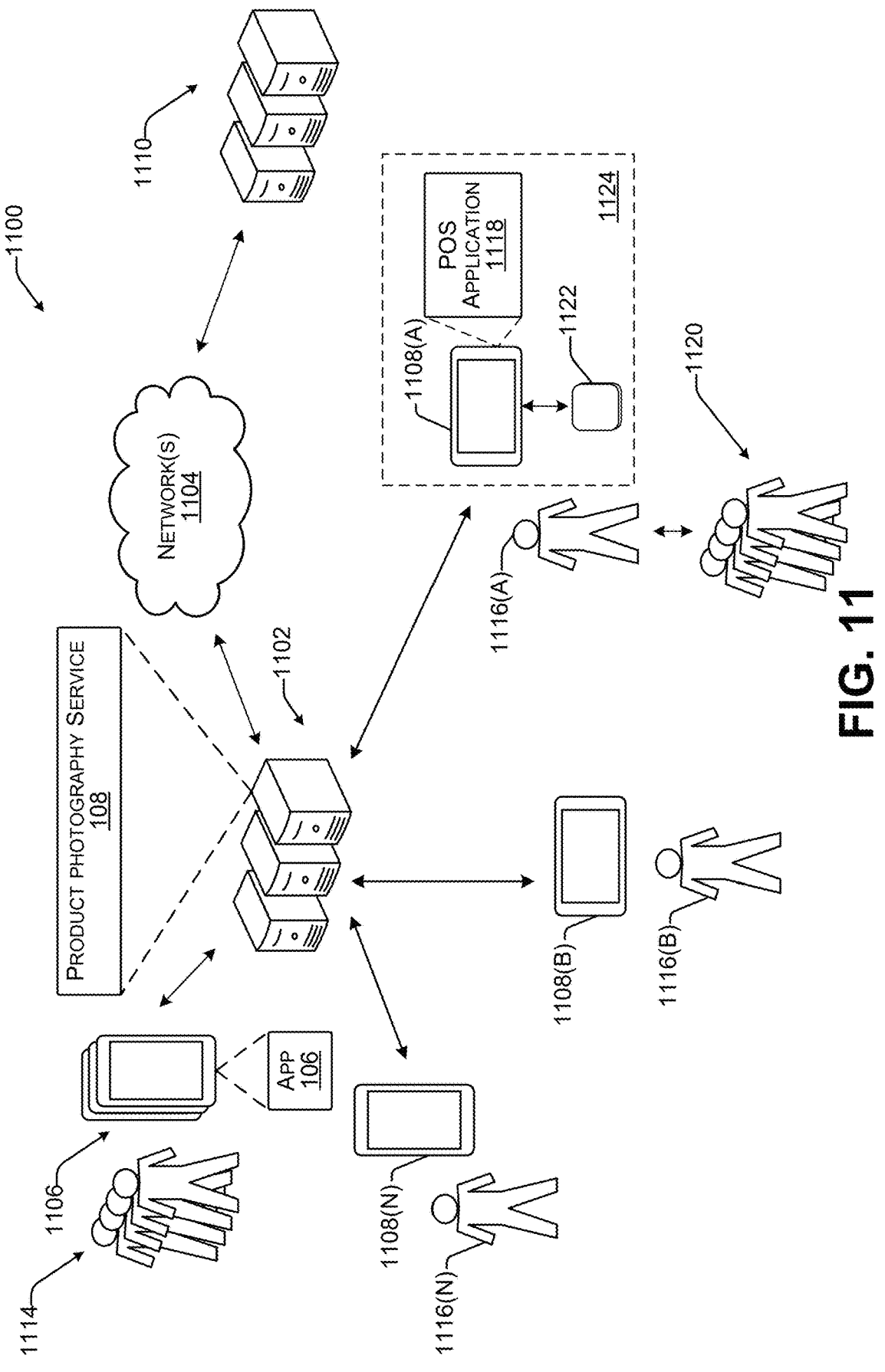
FIG. 11 is an example environment for performing techniques described herein.

FIG. 11 illustrates an example environment 1100. The environment 1100 includes server(s) 1102 that can communicate over a network 1104 with user devices 1106 (which, in some examples can be merchant devices 1108(individually, 1108(A)-1108(N))) and/or server(s) 1110 associated with third-party service provider(s). The server(s) 1102 can be associated with a service provider that can provide one or more services for the benefit of users 1114, as described below. Actions attributed to the service provider can be performed by the server(s) 1102.

For example, the server(s) 1102 may be the same as or similar to the server(s) of the computing platform 110 introduced in FIG. 1, and the server(s) 1102 may implement the product photography service 108, which may implement some of the techniques described herein. Furthermore, the network(s) 1104 may be the same as or similar to the network(s) 112 introduced in FIG. 1.

The environment 1100 can include a plurality of user devices 1106, as described above. Each one of the plurality of user devices 1106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The individual user devices 1106 may be the same as or similar to the electronic device 104 introduced in FIG. 1. In some examples, individual ones of the user devices can be operable by users 1114. The users 1114 can be referred to as customers, buyers, merchants, sellers, borrowers, employees, employers, payors, payees, couriers, artists, musicians, listeners, supervisors, hosts, audience members, and so on. The users 1114 can interact with the user devices 1106 via user interfaces presented via the user devices 1106. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1106 can have an instance or versioned instance of an application, which can be downloaded from an application store, for example, which can present the user interface(s) described herein. In at least one example, a user 1114 can interact with the user interface via touch input, spoken input, or any other type of input.

As described above, in at least one example, the users 1114 can include merchants 1116 (individually, 1116(A)-1116(N)). The individual users 1114 may be the same as or similar to the user 102 introduced in FIG. 1. In an example, the merchants 1116 can operate respective merchant devices 1108, which can be user devices 1106 configured for use by merchants 1116. For the purpose of this discussion, a "merchant" can be any entity that offers items (e.g., goods or services) for purchase or other means of acquisition (e.g., rent, borrow, barter, etc.). The merchants 1116 can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants 1116 can be associated with a same entity but can have different merchant locations and/or can have franchise/franchisee relationships. In additional or alternative examples, the merchants 1116 can be different merchants. That is, in at least one example, the merchant 1116(A) is a different merchant than the merchant 1116(B) and/or the merchant 1116(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1108 can have an instance of a POS application 1118 stored thereon. The POS application 1118 can configure the merchant device 1108 as a POS terminal, which enables the merchant 1116(A) to interact with one or more customers 1120. As described above, the users 1114 can include customers, such as the customers 1120 shown as interacting with the merchant 1116(A). For the purpose of this discussion, a "customer" can be any entity that acquires items from merchants. While only two customers 1120 are illustrated in FIG. 11, any number of customers 1120 can interact with the merchants 1116. Further, while FIG. 11 illustrates the customers 1120 interacting with the merchant 1116(A), the customers 1120 can interact with any of the merchants 1116.

In accordance with the examples described herein, images of items with AI-generated backgrounds can be generated. An example process includes capturing, by executing an application 106 on an electronic device 1106 and using a camera(s) of the electronic device 1106, an image(s) of an item, obtaining first image data that identifies a real-world background in the image(s), and presenting, on a display(s) of the electronic device 1106, a user interface for a user 1114 of the electronic device 1106 to indicate a descriptor(s). The process may further include receiving, via the user interface, an indication of the descriptor(s), generating prompt data representing a prompt(s) based at least in part on the descriptor(s), sending the first image data and the prompt data to a server computer(s) 1102, receiving, from the server computer(s) 1102, second image data output by a trained AI model(s), the second image data representing an AI-generated image(s) with an AI-generated background(s), and presenting, on the display(s), via the application 106, and based at least in part on the second image data, a candidate image(s) with the AI-generated background(s) for selection by the user 1114.

In at least one example, interactions between the customers 1120 and the merchants 1116 that involve the exchange of funds (from the customers 1120) for items (from the merchants 1116) can be referred to as "transactions." In at least one example, the POS application 1118 can determine transaction data associated with the POS transactions. Transaction data can include payment information, which can be obtained from a reader device 1122 associated with the merchant device 1108(A), user authentication data, purchase amount information, point-of-purchase information (e.g., item(s) purchased, date of purchase, time of purchase, subscription type, etc.), etc. The POS application 1118 can send transaction data to the server(s) 1102 such that the server(s) 1102 can track transactions of the customers 1120, merchants 1116, and/or any of the users 1114 over time. Furthermore, the POS application 1118 can present a UI to enable the merchant 1116(A) to interact with the POS application 1118 and/or the service provider via the POS application 1118.

In at least one example, the merchant device 1108(A) can be a special-purpose computing device configured as a POS terminal (via the execution of the POS application 1118). In at least one example, the POS terminal may be connected to a reader device 1122, which is capable of accepting a variety of payment instruments, such as credit cards, debit cards, gift cards, short-range communication based payment instruments, and the like, as described below. In at least one example, the reader device 1122 can plug in to a port in the merchant device 1108(A), such as a microphone port, a headphone port, an audio-jack, a data port, or other suitable port. In additional or alternative examples, the reader device 1122 can be coupled to the merchant device 1108(A) via another wired or wireless connection, such as via a Bluetooth®, BLE, and so on. Additional details are described below with reference to FIG. 14. In some examples, the reader device 1122 can read information from alternative payment instruments including, but not limited to, wristbands and the like.

In some examples, the reader device 1122 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1122, and communicate with the server(s) 1102, which can provide, among other services, a payment processing service. The server(s) 1102 associated with the service provider can communicate with server(s) 1110, as described below. In this manner, the POS terminal and reader device 1122 may collectively process transaction(s) between the merchants 1116 and customers 1120. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, speakers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1122 of the POS system 1124 are shown as separate devices, in additional or alternative examples, the POS terminal and the reader device 1122 can be part of a single device. In some examples, the reader device 1122 can have a display integrated therein for presenting information to the customers 1120. In additional or alternative examples, the POS terminal can have a display integrated therein for presenting information to the customers 1120. POS systems, such as the POS system 1124, may be mobile, such that POS terminals and reader devices may process transactions in disparate locations across the world. POS systems can be used for processing card-present transactions and card-not-present (CNP) transactions, as described below.

A card-present transaction is a transaction where both a customer 1120 and his or her payment instrument are physically present at the time of the transaction. Card-present transactions may be processed by swipes, dips, taps, or any other interaction between a physical payment instrument (e.g., a card), or otherwise present payment instrument, and a reader device 1122 whereby the reader device 1122 is able to obtain payment data from the payment instrument. A swipe is a card-present transaction where a customer 1120 slides a card, or other payment instrument, having a magnetic strip through a reader device 1122 that captures payment data contained in the magnetic strip. A dip is a card-present transaction where a customer 1120 inserts a payment instrument having an embedded microchip (i.e., chip) into a reader device 1122 first. The dipped payment instrument remains in the payment reader until the reader device 1122 prompts the customer 1120 to remove the card, or other payment instrument. While the payment instrument is in the reader device 1122, the microchip can create a one-time code which is sent from the POS system 1124 to the server(s) 1110 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1120 may tap or hover his or her payment instrument (e.g., card, electronic device such as a smart phone running a payment application, etc.) over a reader device 1122 to complete a transaction via short-range communication (e.g., NFC, RFID, Bluetooth®, BLE, etc.). Short-range communication enables the payment instrument to exchange information with the reader device 1122. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1124, the server(s) 1102, and/or the server(s) 1110 may exchange payment information and transaction data to determine whether transactions are authorized. For example, the POS system 1124 may provide encrypted payment data, user authentication data, purchase amount information, point-of-purchase information, etc. (collectively, transaction data) to server(s) 1102 over the network(s) 1104. The server(s) 1102 may send the transaction data to the server(s) 1110. As described above, in at least one example, the server(s) 1110 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network.

The acquirer (e.g., the server(s) 1110 associated therewith) can send a fund transfer request to a server computing device of a card payment network (e.g., Mastercard® VISA®, etc.) to determine whether the transaction is authorized or deficient. In at least one example, the service provider can serve as an acquirer and connect directly with the card payment network.

The card payment network (e.g., the server(s) 1110 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1110 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1110 associated therewith), and a payment authorization message is communicated from the issuer to the POS device via a path opposite of that described above, or via an alternate path.

As described above, the server(s) 1110, which can be associated with payment service provider(s), may determine whether the transaction is authorized based on the transaction data, as well as information relating to parties to the transaction (e.g., the customer 1120 and/or the merchant 1116(A)). The server(s) 1110 may send an authorization notification over the network(s) 1104 to the server(s) 1102, which may send the authorization notification to the POS system 1124 over the network(s) 1104 to indicate whether the transaction is authorized. The server(s) 1102 may also transmit additional information such as transaction identifiers to the POS system 1124. In one example, the server(s) 1102 may include a merchant application and/or other functional components for communicating with the POS system 1124 and/or the server(s) 1110 to authorize or decline transactions.

Based on the authentication notification that is received by the POS system 1124 from server(s) 1102, the merchant 1116(A) may indicate to the customer 1120 whether the transaction has been approved. In some examples, approval may be indicated at the POS system 1124, for example, at a display of the POS system 1124. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the users 1114 can access all of the services of the service provider. In other examples, the users 1114 can have gradated access to the services, which can be based on risk tolerance, IDV outputs, subscriptions, and so on. In at least one example, access to such services can be availed to the merchants 1116 via the POS application 1118. In additional or alternative examples, each service can be associated with its own access point (e.g., application, web browser, etc.).

The service provider can offer payment processing services for processing payments on behalf of the merchants 1116, as described above. For example, the service provider can provision payment processing software, payment processing hardware and/or payment processing services to merchants 1116, as described above, to enable the merchants 1116 to receive payments from the customers 1120 when conducting POS transactions with the customers 1120. For instance, the service provider can enable the merchants 1116 to receive cash payments, payment card payments, and/or electronic payments from customers 1120 for POS transactions and the service provider can process transactions on behalf of the merchants 1116.

As the service provider processes transactions on behalf of the merchants 1116, the service provider can maintain accounts or balances for the merchants 1116 in one or more ledgers. For example, the service provider can analyze transaction data received for a transaction to determine an amount of funds owed to a merchant 1116(A) for the transaction. In at least one example, such an amount can be a total purchase price less fees charged by the service provider for providing the payment processing services. Based on determining the amount of funds owed to the merchant 1116(A), the service provider can deposit funds into an account of the merchant 1116(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1116(A) to a bank account of the merchant 1116(A) that is held at a bank or other financial institution (e.g., associated with the server(s) 1110). Scheduled deposits can occur at a prearranged time after a POS transaction is funded, which can be a business day after the POS transaction occurred, or sooner or later. In some examples, the merchant 1116(A) can access funds prior to a scheduled deposit. For instance, the merchant 1116(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1116(A) can have a payment instrument that is linked to the stored balance that enables the merchant to access the funds without first transferring the funds from the account managed by the service provider to the bank account of the merchant 1116(A).

In at least one example, the service provider may provide inventory management services. That is, the service provider may provide inventory tracking and reporting. Inventory management services may enable the merchant 1116(A) to access and manage a database storing data associated with a quantity of each item that the merchant 1116(A) has available (i.e., an inventory). Furthermore, in at least one example, the service provider can provide catalog management services to enable the merchant 1116(A) to maintain a catalog, which can be a database storing data associated with items that the merchant 1116(A) has available for acquisition (i.e., catalog management services). In at least one example, the catalog may include a plurality of data items and a data item of the plurality of data items may represent an item that the merchant 1116(A) has available for acquisition. The service provider can offer recommendations related to pricing of the items, placement of items on the catalog, and multi-party fulfillment of the inventory.

In at least one example, the service provider can provide business banking services, which allow the merchant 1116 (A) to track deposits (from payment processing and/or other sources of funds) into an account of the merchant 1116(A), payroll payments from the account (e.g., payments to employees of the merchant 1116(A)), payments to other merchants (e.g., business-to-business) directly from the account or from a linked debit card, withdrawals made via scheduled deposit and/or instant deposit, etc. Furthermore, the business banking services can enable the merchant 1116(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1116 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, music studio recording time, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1116. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the service provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1114 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1116. In at least one example, the service provider can recommend and/or generate content items to supplement omni-channel presences of the merchants 1116. That is, if a merchant of the merchants 1116 has a web page, the service provider—via the web-development or other services—can recommend and/or generate additional content items to be presented via other channel(s), such as social media, email, media content streaming, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1114 to set schedules for scheduling appointments and/or users 1114 to schedule appointments.

In some examples, the service provider can provide restaurant management services to enable users 1114 to make and/or manage reservations, to monitor front-of-house and/or back-of-house operations, and so on. In such examples, the merchant device(s) 1108 and/or server(s) 1102 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1114 who can travel between locations to perform services for a requesting user 1114 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1106.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1114, voice inputs into a virtual assistant or the like, to determine intents of user(s) 1114. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1114 may be new to the service provider such that the user 1114 that has not registered (e.g., subscribed to receive access to one or more services offered by the service provider) with the service provider. The service provider can offer onboarding services for registering a potential user 1114 with the service provider. In some examples, onboarding can involve presenting various questions, prompts, and the like to a potential user 1114 to obtain information that can be used to generate a profile for the potential user 1114. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In at least one example, responsive to the potential user 1114 providing information requested as part of onboarding, the potential user 1114 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1110). That is, the service provider can offer IDV services to verify the identity of users 1114 seeking to use or using their services. Identity verification requires a customer (or potential customer) to provide information that is used by compliance departments to prove that the information is associated with an identity of a real person or entity (e.g., an artist). In at least one example, the service provider can perform services for determining whether identifying information provided by a user 1114 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1110 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1102) and/or the server(s) 1110 via the network(s) 1104. In some examples, the merchant device(s) 1108 are not capable of connecting with the service provider (e.g., the server(s) 1102) and/or the server(s) 1110, due to a network connectivity issue, for example. In additional or alternative examples, the server(s) 1102 are not capable of communicating with the server(s) 1110 due to network connectivity issue, for example. In such examples, devices may operate in "offline" mode where at least some payment data is stored (e.g., on the merchant device(s) 1108) and/or the server(s) 1102 until connectivity is restored and the payment data can be transmitted to the server(s) 1102 and/or the server(s) 1110 for processing.

In at least one example, the service provider can be associated with a hub, such as an order hub, an inventory hub, a fulfillment hub and so on, which can enable integration with one or more additional service providers (e.g., associated with the additional server(s) 1110). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1106 that are in communication with server(s) 1102 of the service provider. That is, techniques described herein are directed to a specific implementation—or, a practical application—of utilizing a distributed system of user devices 1106 that are in communication with server(s) 1102 of the service provider to perform a variety of services, as described above. The unconventional configuration of the distributed system described herein enables the server(s) 1102 that are remotely-located from end-users (e.g., users 1114) to intelligently offer services based on aggregated data associated with the end-users, such as the users 1114 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1114 and user devices 1106. Furthermore, such features are changed dynamically based on the profiles of the users involved interacting with the GUIs. As such, techniques described herein are directed to improvements to computing systems.

Figure 12:
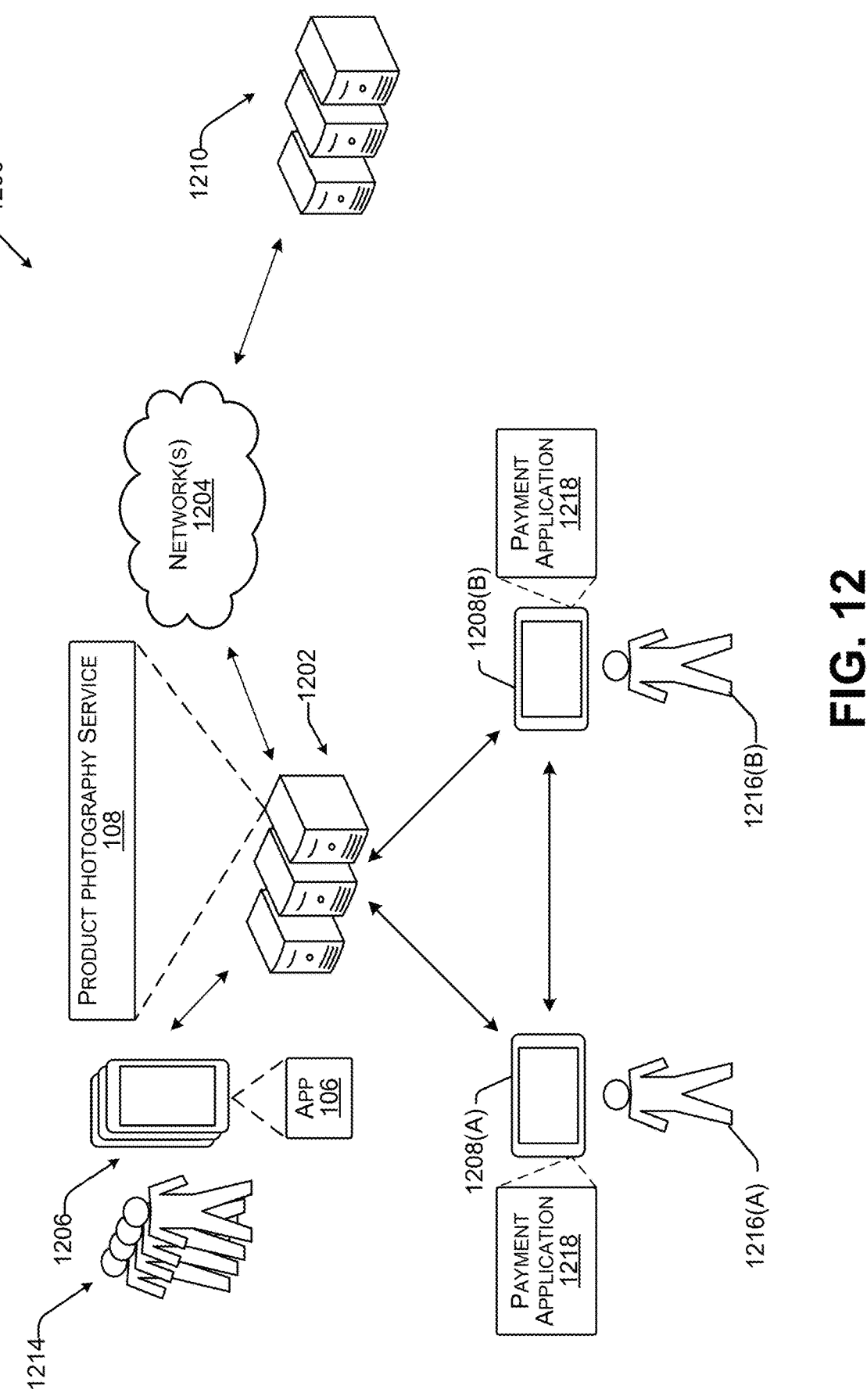
FIG. 12 is an example environment for performing techniques described herein.

FIG. 12 illustrates an example environment 1200. The environment 1200 includes server(s) 1202 that can communicate over a network 1204 with user devices 1206 (which, in some examples can be user devices 1208 (individually, 1208(A), 1208(B)) and/or server(s) 1210 associated with third-party service provider(s). The server(s) 1202 can be associated with a service provider that can provide one or more services for the benefit of users 1214, as described below. Actions attributed to the service provider can be performed by the server(s) 1202. In some examples, the service provider referenced in FIG. 11 can be the same or different than the service provider referenced in FIG. 12.

For example, the server(s) 1202 may be the same as or similar to the server(s) of the computing platform 110 introduced in FIG. 1, and the server(s) 1202 may implement the product photography service 108. Furthermore, the network(s) 1204 may be the same as or similar to the network(s) 112 introduced in FIG. 1.

The environment 1200 can include a plurality of user devices 1206, as described above. Each one of the plurality of user devices 1206 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The user devices 1206 (and in some examples, the user devices 1208) may be the same as or similar to the electronic device 104 introduced in FIG. 1. In some examples, individual ones of the user devices can be operable by users 1214. The users 1214 can be referred to as customers, buyers, merchants, sellers, borrowers, employees, employers, payors, payees, couriers, artists, musicians, listeners, supervisors, hosts, audience members, and so on. The users 1214 can interact with the user devices 1206 via user interfaces presented via the user devices 1206. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1206 can have an instance or versioned instance of an application, which can be downloaded from an application store, for example, which can present the user interface(s) described herein. In at least one example, a user 1214 can interact with the user interface via touch input, spoken input, or any other type of input.

In at least one example, the service provider can provide a peer-to-peer payment service that enables peer-to-peer payments between two or more users 1214. Two users, user 1216(A) and user 1216(B) are illustrated in FIG. 12 as "peers" in a peer-to-peer payment. In at least one example, the service provider can communicate with instances of a payment application 1218 (or other access point) installed on devices 1206 configured for operation by users 1214. In an example, an instance of the payment application 1218 executing on a first device 1208(A) operated by a payor (e.g., user 1216(A)) can send a request to the service provider to transfer an asset (e.g., fiat currency, non-fiat currency, digital assets such as non-fungible tokens (NFTs), cryptocurrency, securities, gift cards, and/or related assets) from the payor to a payee (e.g., user 1216(B)) via a peer-to-peer payment. In some examples, assets associated with an account of the payor are transferred to an account of the payee. In some examples, assets can be held at least temporarily in an account of the service provider prior to transferring the assets to the account of the payee. The users 1214 (and in some examples, the users 1216) may be the same as or similar to the user 102 introduced in FIG. 1.

In accordance with the examples described herein, images of items with AI-generated backgrounds can be generated. An example process includes capturing, by executing an application 106 on an electronic device 1206 and using a camera(s) of the electronic device 1206, an image(s) of an item, obtaining first image data that identifies a real-world background in the image(s), and presenting, on a display(s) of the electronic device 1206, a user interface for a user 1214 of the electronic device 1206 to indicate a descriptor(s). The process may further include receiving, via the user interface, an indication of the descriptor(s), generating prompt data representing a prompt(s) based at least in part on the descriptor(s), sending the first image data and the prompt data to a server computer(s) 1202, receiving, from the server computer(s) 1202, second image data output by a trained AI model(s), the second image data representing an AI-generated image(s) with an AI-generated background(s), and presenting, on the display(s), via the application 106, and based at least in part on the second image data, a candidate image(s) with the AI-generated background(s) for selection by the user 1214.

In some examples, the service provider can utilize a ledger system to track transfers of assets between users 1214. FIG. 13, below, provides additional details associated with such a ledger system. The ledger system can enable users 1214 to own fractional shares of assets that are not conventionally available. For instance, a user can own a fraction of a Bitcoin, an NFT, or a stock. Additional details are described herein.

In at least one example, the service provider can facilitate transfers and can send notifications related thereto to instances of the payment application 1218 executing on user device(s) of payee(s). As an example, the service provider can transfer assets from an account of user 1216(A) to an account of the user 1216(B) and can send a notification to the user device 1208(B) of the user 1216(B) for presentation via a user interface. The notification can indicate that a transfer is in process, a transfer is complete, or the like. In some examples, the service provider can send additional or alternative information to the instances of the payment application 1218 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1202 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 1218 executing on the user devices 1206. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 12 or a third-party service provider associated with the server(s) 1210. In examples where the content provider is a third-party service provider, the server(s) 1210 can be accessible via one or more APIs or other integrations. The forum can be employed by a content provider to enable users of the forum to interact with one another (e.g., through creating messages, posting comments, streaming media content, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 12. For instance, the service provider can offer messaging services that provide a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1206 (e.g., mobile device or conventional personal computer (PC)) based on instructions transmitted to and from the server(s) 1202 (which, in such an example can be called a "messaging server"). In some instances, the messaging application can include a payment application with messaging capability that enables users of the payment application to communicate with one another. In such instances, the payment application can be executed on a user device 1206 based on instructions transmitted to and from the server(s) 1202 (e.g., the payment service discussed in this description or another payment service that supports payment transactions). In some examples, the messaging application can be provided by a third-party service provider associated with the server(s) 1210. In examples where the messaging application is a third-party service provider, the server(s) 1210 can be accessible via one or more APIs or other integrations.

As described above, the service provider can facilitate peer-to-peer transactions, which can enable users 1214 to transfer fiat currency, non-fiat currency, cryptocurrency, securities, or other assets, or portions thereof, to other users 1214. In at least one example, individual users can be associated with user accounts. Additional details associated with user accounts and the transfer of assets between users 1214 are described below with reference to FIG. 13.

Furthermore, the service provider of FIG. 12 can enable users 1214 to perform banking transactions via instances of the payment application 1218. For example, users can configure direct deposits or other deposits for adding assets to their various ledgers/balances. Further, users 1214 can configure bill pay, recurring payments, and/or the like using assets associated with their accounts. In addition to sending and/or receiving assets via peer-to-peer transactions, users 1214 buy and/or sell assets via asset networks such as cryptocurrency networks, securities networks, and/or the like.

FIG. 13 illustrates example data store(s) 1300 that can be associated with the server(s) 1202. The data store(s) 1300 may be the same as or similar to the data store(s) 114 introduced in FIG. 1

In at least one example, the data store(s) 1300 can store assets in an asset storage 1302, as well as data in user account(s) 1304. In some examples, user account(s) 1304 can include merchant account(s) 1306, and/or customer account(s) 1308. In at least one example, the asset storage 1302 can be used to store assets managed by the service provider of FIG. 12. In at least one example, the asset storage 1302 can be used to record whether individual ones of the assets are registered to users. For example, the asset storage 1302 can include an asset wallet 1310 for storing records of assets owned by the service provider of FIG. 12, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1210 can be associated therewith. In some examples, the asset wallet 1310 can communicate with the asset network via one or more components associated with the server(s) 1202.

The asset wallet 1310 can be associated with one or more addresses and can vary addresses used to acquire assets (e.g., from the asset network(s)) so that its holdings are represented under a variety of addresses on the asset network. In examples where the service provider of FIG. 12 has its own holdings of cryptocurrency (e.g., in the asset wallet 1310), a user can acquire cryptocurrency directly from the service provider of FIG. 12. In some examples, the service provider of FIG. 12 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider can provide the same or similar functionality for securities or other assets.

The asset storage 1302 may contain ledgers that store records of assignments of assets to users 1214. Specifically, the asset storage 1302 may include asset ledger 1334, fiat currency ledger 1314, and other ledger(s) 1316, which can be used to record transfers of assets between users 1214 of the service provider and/or one or more third-parties (e.g., merchant network(s), payment card network(s), ACH network(s), equities network(s), the asset network, securities networks, etc.). In doing so, the asset storage 1302 can maintain a running balance of assets managed by the service provider of FIG. 12. The ledger(s) of the asset storage 1302 can further indicate some of the running balance for each of the ledger(s) stored in the asset storage 1302 is assigned or registered to one or more user account(s) 1304.

In at least one example, the asset storage 1302 can include transaction logs 1318, which can include records of past transactions involving the service provider of FIG. 12. In at least one example, transaction data, as described herein, can be stored in association with the transaction logs 1318.

In some examples, the data store(s) 1300 can store a private blockchain 1319. A private blockchain 1319 can function to record sender addresses, recipient addresses, public keys, values of cryptocurrency transferred, and/or can be used to verify ownership of cryptocurrency tokens to be transferred. In some examples, the service provider of FIG. 12 can record transactions taking place within the service provider of FIG. 12 involving cryptocurrency until the number of transactions has exceeded a determined limit (e.g., number of transactions, storage space allocation, etc.). Based at least in part on determining that the limit has been reached, the service provider of FIG. 12 can publish the transactions in the private blockchain 1319 to a public blockchain (e.g., associated with the asset network), where miners can verify the transactions and record the transactions to blocks on the public blockchain. In at least one example, the service provider of FIG. 12 can participate as miner(s) at least for its transactions to be posted to the public blockchain.

In at least one example, the data store(s) 1300 can store and/or manage accounts, such as user account(s) 1304, merchant account(s) 1306, and/or customer account(s) 1308. In at least one example, the user account(s) 1304 may store records of user accounts associated with the users 1214. In at least one example, the user account(s) 1304 can include a user account 1320, which can be associated with a user (of the users 1214). Other user accounts of the user account(s) 1304 can be similarly structured to the user account 1320, according to some examples. In other examples, other user accounts may include more or less data and/or account information than that provided by the user account 1320. In at least one example, the user account 1320 can include user account data 1328, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1328 can include account activity 1330 and user wallet key(s) 1332. The account activity 1330 may include a transaction log for recording transactions associated with the user account 1320. In some examples, the user wallet key(s) 1332 can include a public-private key-pair and a respective address associated with the asset network or other asset networks. In some examples, the user wallet key(s) 1332 may include one or more key pairs, which can be unique to the asset network or other asset networks.

In addition to the user account data 1328, the user account 1320 can include ledger(s) for account(s) managed by the service provider of FIG. 12, for the user. For example, the user account 1320 may include an asset ledger 1334, a fiat currency ledger 1336, and/or one or more other ledgers 1338. The ledger(s) can indicate that a corresponding user utilizes the service provider of FIG. 12 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual ones of the ledger(s), or portions thereof, can be maintained by the service provider of FIG. 12.

In some examples, the asset ledger 1334 can store a balance for each of one or more cryptocurrencies (e.g., Bitcoin, Ethereum, Litecoin, etc.) registered to the user account 1320. In at least one example, the asset ledger 1334 can further record transactions of cryptocurrency assets associated with the user account 1320. For example, the user account 1320 can receive cryptocurrency from the asset network using the user wallet key(s) 1332. In some examples, the user wallet key(s) 1332 may be generated for the user upon request. User wallet key(s) 1332 can be requested by the user in order to send, exchange, or otherwise control the balance of cryptocurrency held by the service provider of FIG. 12 (e.g., in the asset wallet 1310) and registered to the user. In some examples, the user wallet key(s) 1332 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 12 and the value is credited as a balance in asset ledger 1334), by purchasing currency in the form associated with the account using currency in a different form (e.g., buying a value of cryptocurrency from the service provider of FIG. 12 using a value of fiat currency reflected in fiat currency ledger 1336, and crediting the value of cryptocurrency in asset ledger 1334), or by conducting a transaction with another user (customer or merchant) of the service provider of FIG. 12 wherein the account receives incoming currency (which can be in the form associated with the account or a different form, in which the incoming currency may be converted to the form associated with the account). In some examples, the user account data 1328 can include preferences for maintaining balances of individual ones of the ledgers. For example, the service provider of FIG. 12 can automatically debit the fiat currency ledger 1336 to increase the asset ledger 1334, or another account associated with the user whenever the cryptocurrency balance (e.g., of the asset ledger 1334) falls below a stated level (e.g., a threshold). Conversely, in some embodiments, the service provider of FIG. 12 can automatically credit the fiat currency ledger 1336 to decrease the asset ledger 1334 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 12 (i.e., an external account). In at least one example, the user can transfer all or a portion of a balance of the cryptocurrency stored in the third-party cryptocurrency wallet to the service provider of FIG. 12. Such a transaction can request that the user to transfer an amount of the cryptocurrency in a message signed by user's private key to an address provided by the service provider of FIG. 12. In at least one example, the transaction can be sent to miners to bundle the transaction into a block of transactions and to verify the authenticity of the transactions in the block. Once a miner has verified the block, the block is written to a public, distributed blockchain where the service provider of FIG. 12 can then verify that the transaction has been confirmed and can credit the user's asset ledger 1334 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 12. As described above, in some examples, the service provider of FIG. 12 can acquire cryptocurrency from a third-party source. In such examples, the asset wallet 1310 can be associated with different addresses and can vary addresses used to acquire cryptocurrency so that its holdings are represented under a variety of addresses on a blockchain. When the service provider of FIG. 12 has their own holdings of cryptocurrency, users can acquire cryptocurrency directly from the service provider of FIG. 12. In some examples, the service provider of FIG. 12 can include logic for buying and selling cryptocurrency in order to maintain a desired level of cryptocurrency. The desired level can be based on a volume of transactions over a period, balances of collective user profiles' cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from customer-merchant transactions, and therefore not necessarily time-sensitive.

In examples where the service provider of FIG. 12 has its own cryptocurrency assets, cryptocurrency transferred in a transaction (e.g., data with address provided for receipt of transaction and a balance of cryptocurrency transferred in the transaction) can be stored in the asset wallet 1310. In at least one example, the service provider of FIG. 12 can credit the asset ledger 1334 of the user. Additionally, while the service provider of FIG. 12 recognizes that the user retains the value of the transferred cryptocurrency through crediting the asset ledger 1334, any person that inspects the blockchain will see the cryptocurrency as having been transferred to the service provider of FIG. 12. In some examples, the asset wallet 1310 can be associated with many different addresses. In such examples, any person that inspects the blockchain may not easily associate all cryptocurrency stored in asset wallet 1310 as belonging to the same entity. It is this presence of a private ledger that is used for real-time transactions and maintained by the service provider of FIG. 12, combined with updates to the public ledger at other times, that allows for extremely fast transactions using cryptocurrency to be achieved. In some examples, the "private ledger" can refer to the asset ledger 1334, which in some examples, can utilize the private blockchain 1319, as described herein. The "public ledger" can correspond to a public blockchain associated with the asset network.

In at least one example, a user's asset ledger 1334, fiat currency ledger 1336, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1334. In some examples, a user can receive fiat currency or another currency in the form of payment for a transaction with another user. In at least one example, at least a portion of such funds can be converted into cryptocurrency by the service provider of FIG. 12 and used to fund the asset ledger 1334 of the user.

As addressed above, in some examples, users can also have other accounts maintained by the service provider of FIG. 12. For example, a user can also have an account in U.S. dollars, which can be tracked, for example, via the fiat currency ledger 1336. Such an account can be funded by transferring money from a bank account at a third-party bank to an account maintained by the service provider of FIG. 12 as is conventionally known. In some examples, a user can receive fiat currency in the form of payment for a transaction with another user. In such examples, at least a portion of such funds can be used to fund the fiat currency ledger 1336.

In some examples, a user can have one or more internal payment cards registered with the service provider of FIG. 12. Internal payment cards can be linked to one or more of the accounts associated with the user account 1320. In some embodiments, options with respect to internal payment cards can be adjusted and managed using an application (e.g., the payment application 1218).

In at least one example, as described above, each ledger can correspond to an account of the user that is managed by the service provider of FIG. 12. In at least one example, individual ones of the accounts can be associated with a wallet or a stored balance for use in payment transactions, peer-to-peer transactions, payroll payments, etc.

In at least one example, the user account 1320 can be associated with an asset wallet 1340. The asset wallet 1340 of the user can be associated with account information that can be stored in the user account data 1328 and, in some examples, can be associated with the user wallet key(s) 1332. In at least one example, the asset wallet 1340 can store data indicating an address provided for receipt of a cryptocurrency transaction. In at least one example, the balance of the asset wallet 1340 can be based at least in part on a balance of the asset ledger 1334. In at least one example, funds availed via the asset wallet 1340 can be stored in the asset wallet 1340 or the asset wallet 1310. Funds availed via the asset wallet 1310 can be tracked via the asset ledger 1334. The asset wallet 1340, however, can be associated with additional cryptocurrency funds.

In at least one example, when the service provider of FIG. 12 includes a private blockchain 1319 for recording and validating cryptocurrency transactions, the asset wallet 1340 can be used instead of, or in addition to, the asset ledger 1334. For example, at least one example, a merchant can provide the address of the asset wallet 1340 for receiving payments. In an example where a customer is paying in cryptocurrency and the customer has their own cryptocurrency wallet account associated with the service provider of FIG. 12, the customer can send a message signed by its private key including its wallet address (i.e., of the customer) and identifying the cryptocurrency and value to be transferred to the merchant's asset wallet 1340. The service provider of FIG. 12 can complete the transaction by reducing the cryptocurrency balance in the customer's cryptocurrency wallet and increasing the cryptocurrency balance in the merchant's asset wallet 1340. In addition to recording the transaction in the respective cryptocurrency wallets, the transaction can be recorded in the private blockchain 1319 and the transaction can be confirmed. A user can perform a similar transaction with cryptocurrency in a peer-to-peer transaction as described above. In at least one example, the cryptocurrency wallet account 1330 can be funded by a balance transfer from a third-party cryptocurrency wallet, as described above. Such a transaction can include requesting a user to transfer an amount of cryptocurrency in a message signed by the user's private key to an address of the cryptocurrency wallet account 1330. The transferred amount of cryptocurrency can then be within the cryptocurrency wallet account 1330 for use in later transactions.

While the asset ledger 1334 and/or asset wallet 1340 are each described above with reference to cryptocurrency, the asset ledger 1334 and/or asset wallet 1340 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 12 is an aspect of the technology disclosed that enables technical advantages of increased processing speed and improved security.

Figure 14:
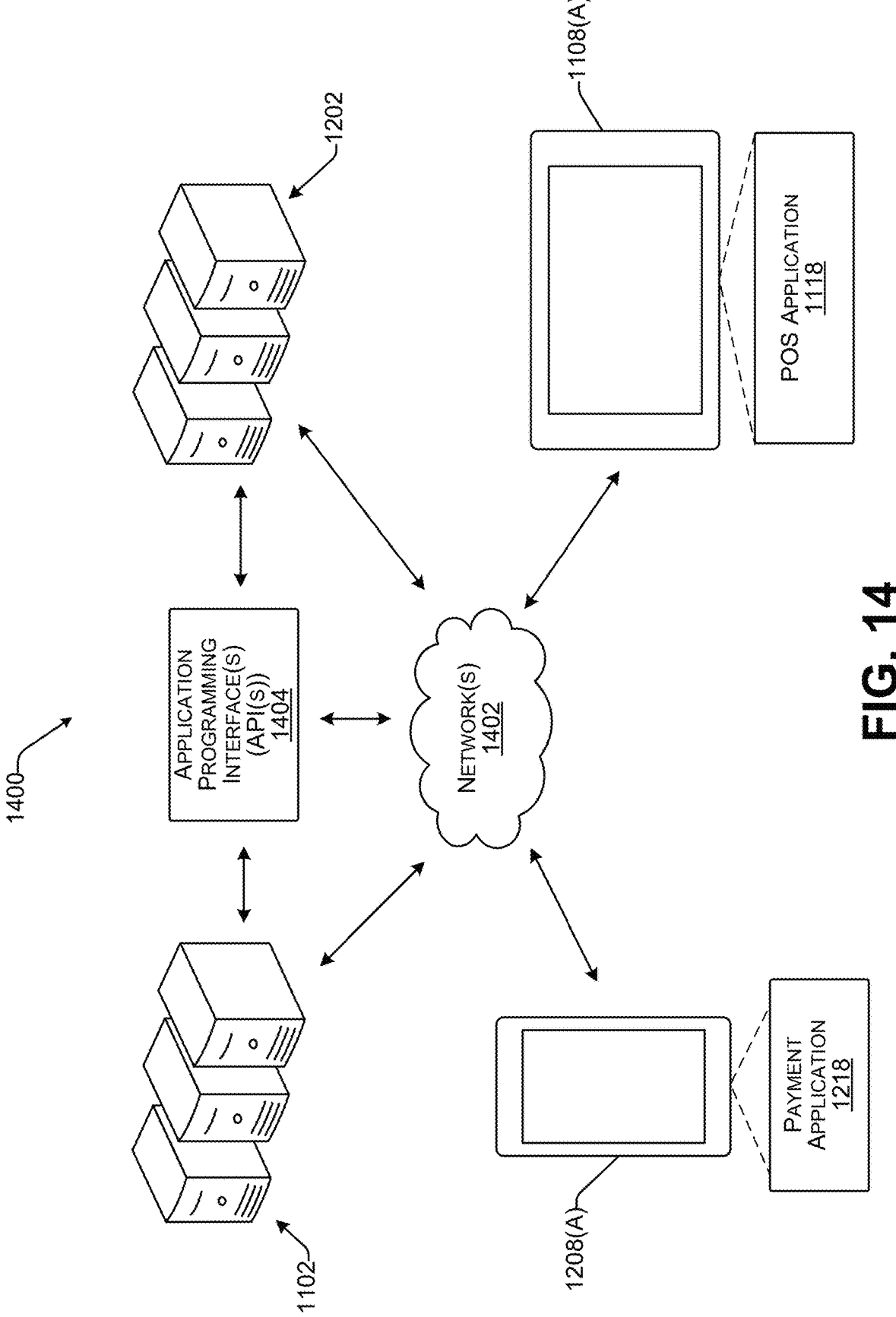
FIG. 14 is an example environment for performing techniques described herein.

FIG. 14 illustrates an example environment 1400 wherein the environment 1100 and the environment 1200 can be integrated to enable payments at the point-of-sale using assets associated with user accounts in the peer-to-peer environment of FIG. 12. As illustrated, each of the components can communicate with one another via one or more networks 1402. In some examples, one or more APIs 1404 or other functional components can be used to facilitate such communication.

In at least one example, the example environment 1400 can enable contactless payments, via integration of peer-to-peer payment, or other payment making, platform(s) and payment processing platform(s), are described herein. For the purpose of FIG. 14, the environment 1100 can refer to a payment processing platform and the environment 1200 can refer to a peer-to-peer payment, or payment making, platform. In an example, such an integration can enable a customer to participate in a transaction via their own computing device instead of interacting with a merchant device of a merchant, such as the merchant device 1108(A). In such an example, the POS application 1118, associated with a payment processing platform and executable by the merchant device 1108(A) of the merchant, can present a Quick Response (QR) code, or other code that can be used to identify a transaction (e.g., a transaction code), in association with a transaction between the customer and the merchant. The QR code, or other transaction code, can be provided to the POS application 1118 via an API associated with the peer-to-peer payment platform. In an example, the customer can utilize their own computing device, such as the user device 1208(A), to capture the QR code, or the other transaction code, and to provide an indication of the captured QR code, or other transaction code, to server(s) 1102 and/or server(s) 1202.

Based at least in part on the integration of the peer-to-peer payment platform and the payment processing platform (e.g., via the API), the server(s) 1102 and/or 1202 associated with each can exchange communications with each other— and with a payment application 1218 associated with the peer-to-peer payment platform and/or the POS application 1118—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1208(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1208(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1118 and the payment application 1218, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1208(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1118, associated with a payment processing platform, on the merchant device 1108(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1108(A) can present a QR code, or other transaction code, that can be associated with a peer-to-peer payment platform. The customer can use a camera associated with the user device 1208(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1118, associated with a payment processing platform, on the merchant device 1108(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1118 can cause a text message with a resource locator (e.g., uniform resource locator (URL)) that can be associated with a peer-to-peer payment platform to be sent to the user device 1208(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1208 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1118 of a merchant device 1108(A) at a brick-and-mortar store of a merchant to a payment application 1218 of a user device 1208(A) of a customer to enable the customer to participate in a transaction via their own computing device. For instance, in a "scan to pay" example as described above, based at least in part on capturing the QR code, or other transaction code, via the user device 1208(A), the payment processing platform can provide transaction data to the peer-to-peer payment platform for presentation via the payment application 1218 on the user device 1208(A). In some examples, the customer can watch items being added to their cart (e.g., via a user interface presented via the payment application). As an item is added to a virtual cart by the merchant—via the POS application 1118 on the merchant device 1108(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1218 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1208(A) during or after payment of the transaction.

In some examples, based at least in part on capturing the QR code, or other transaction code, the payment processing platform can provide transaction data to the peer-to-peer payment platform for presentation via the payment application 1218 on the computing device of the customer, such as the user device 1208(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1218 such that the customer can provide gratuity, feedback, loyalty information, or the like, via an interaction with the user interface. In another example, the payment processing platform can adjust a total amount of a transaction based on events during a shopping experience, such as adding or removing a charge to the total amount based on whether a media content item requested by the customer to be played during a shopping experience was in fact played. In some examples, because the customer has already authorized payment via the peer-to-peer payment platform, if the customer inputs a tip and/or an event affecting the total amount of the transaction is triggered, the peer-to-peer payment platform can transfer additional funds, associated with the tip or event, to the payment processing platform. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, play media content, or the like without being watched by the merchant or other customers.

In some examples, such as when the QR code, or other transaction code, is captured by the computing device of the customer prior to a payment selection user interface being presented via the POS application 1118, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1218 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 15:
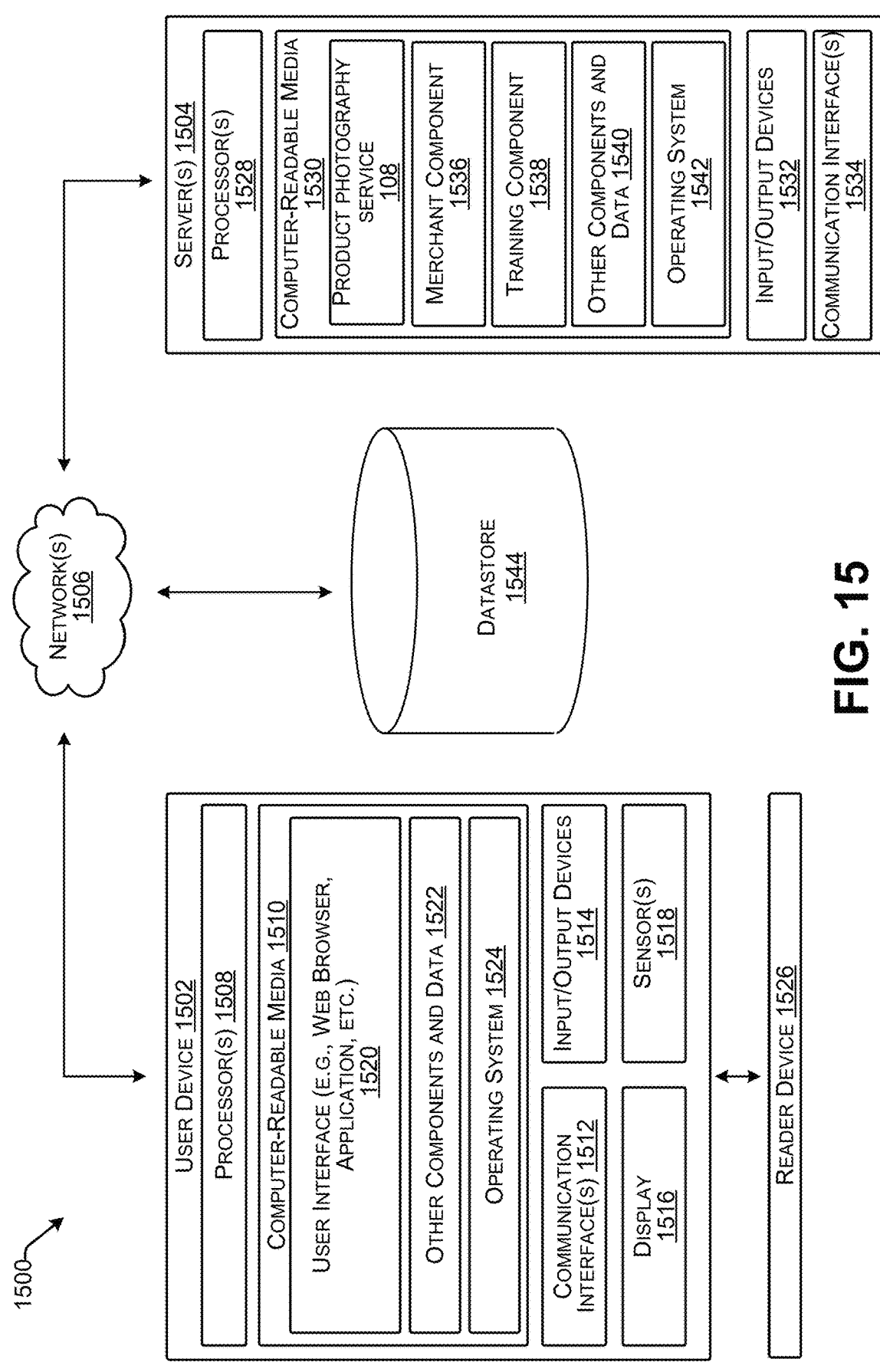
FIG. 15 is an example block diagram illustrating a system for performing techniques described herein.

FIG. 15 depicts an illustrative block diagram illustrating a system 1500 for performing techniques described herein. The system 1500 includes a user device 1502, that communicates with server computing device(s) (e.g., server(s) 1504) via network(s) 1506 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1502 is illustrated, in additional or alternate examples, the system 1500 can have multiple user devices, as described above with reference to FIG. 6.

For example, the server(s) 1504 may be the same as or similar to the server(s) of the computing platform 110 introduced in FIG. 1, and the server(s) 1504 may implement the product photography service 108. Furthermore, the network(s) 1506 may be the same as or similar to the network(s) 112 introduced in FIG. 1, and the user device 1502 may be the same as or similar to the electronic device 104 introduced in FIG. 1.

In at least one example, the user device 1502 can be any suitable type of computing device, e.g., portable, semi-portable, semi-stationary, or stationary. Some examples of the user device 1502 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1502 can be any computing device capable of sending communications and performing the functions according to the techniques described herein. The user device 1502 can include devices, e.g., payment card readers, or components capable of accepting payments, as described below.

In the illustrated example, the user device 1502 includes one or more processors 1508, one or more computer-readable media 1510, one or more communication interface(s) 1512, one or more input/output (I/O) devices 1514, a display 1516, sensor(s) 1518, one or more encoders 1546, and one or more decoders 1548.

In at least one example, each processor 1508 can itself comprise one or more processors or processing cores. For example, the processor(s) 1508 can be implemented as one or more microprocessors, microcomputers, microcontrollers, digital signal processors, central processing units, state machines, logic circuitries, and/or any devices that manipulate signals based on operational instructions. In some examples, the processor(s) 1508 can be one or more hardware processors and/or logic circuits of any suitable type specifically programmed or configured to execute the algorithms and processes described herein. The processor(s) 1508 can be configured to fetch and execute computer-readable processor-executable instructions stored in the computer-readable media 1510.

Depending on the configuration of the user device 1502, the computer-readable media 1510 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1510 can include, but is not limited to, RAM, ROM, EEPROM, flash memory, solid-state storage, magnetic disk storage, optical storage, and/or other computer-readable media technology. Further, in some examples, the user device 1502 can access external storage, such as RAID storage systems, storage arrays, network attached storage, storage area networks, cloud storage, or any other medium that can be used to store information and that can be accessed by the processor(s) 1508 directly or through another computing device or network. Accordingly, the computer-readable media 1510 can be computer storage media able to store instructions, components or components that can be executed by the processor(s) 1508. Further, when mentioned, non-transitory computer-readable media exclude media such as energy, carrier signals, electromagnetic waves, and signals per se.

The computer-readable media 1510 can be used to store and maintain any number of functional components that are executable by the processor(s) 1508. In some implementations, these functional components comprise instructions or programs that are executable by the processor(s) 1508 and that, when executed, implement operational logic for performing the actions and services attributed above to the user device 1502. Functional components stored in the computer-readable media 1510 can include a user interface 1520 to enable users to interact with the user device 1502, and thus the server(s) 1504 and/or other networked devices. In at least one example, the user interface 1520 can be presented via a web browser, or the like. In other examples, the user interface 1520 can be presented via an application, such as a mobile application or desktop application, which can be provided by a service provider associated with the server(s) 1504, or which can be an otherwise dedicated application. In some examples, the user interface 1520 can be the user interface(s) 124, 200, 300, 400, 700, and/or 800. In at least one example, a user can interact with the user interface via touch input, spoken input, gesture, or any other type of input. The word "input" is also used to describe "contextual" input that may not be directly provided by the user via the user interface 1520. For example, user's interactions with the user interface 1520 are analyzed using, e.g., natural language processing techniques, user movement tracking techniques, eye tracking techniques, etc. to determine context or intent of the user, which may be treated in a manner similar to "direct" user input.

In accordance with the examples described herein, images of items with AI-generated backgrounds can be generated. An example process includes capturing, by executing an application on an electronic device 1502 and using a camera(s) of the electronic device 1502, an image(s) of an item, obtaining first image data that identifies a real-world background in the image(s), and presenting, on a display(s) 1516 of the electronic device 1502, a user interface 1520 for a user of the electronic device 1502 to indicate a descriptor(s). The process may further include receiving, via the user interface 1520, an indication of the descriptor(s), generating prompt data representing a prompt(s) based at least in part on the descriptor(s), sending the first image data and the prompt data to a server computer(s) 1504, receiving, from the server computer(s) 1504, second image data output by a trained AI model(s), the second image data representing an AI-generated image(s) with an AI-generated background(s), and presenting, on the display(s) 1516, via the application, and based at least in part on the second image data, a candidate image(s) with the AI-generated background(s) for selection by the user.

Depending on the type of the user device 1502, the computer-readable media 1510 can also optionally include other functional components and data, such as other components and data 1522, which can include programs, drivers, etc., and the data used or generated by the functional components. In addition, the computer-readable media 1510 can also store data, data structures and the like, that are used by the functional components. Further, the user device 1502 can include many other logical, programmatic and physical components, of which those described are merely examples that are related to the discussion herein.

In at least one example, the computer-readable media 1510 can include additional functional components, such as an operating system 1524 for controlling and managing various functions of the user device 1502 and for enabling basic user interactions.

The communication interface(s) 1512 can include one or more interfaces and hardware components for enabling communication with various other devices, such as over the network(s) 1506 or directly. For example, communication interface(s) 1512 can enable communication through one or more network(s) 1506, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1506 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1502 can further include one or more input/output (I/O) devices 1514. The I/O devices 1514 can include speakers, a microphone, a camera, and various user controls (e.g., buttons, a joystick, a keyboard, a keypad, etc.), a haptic output device, and so forth. The I/O devices 1514 can also include attachments that leverage the accessories (audio-jack, USB-C, Bluetooth, etc.) to connect with the user device 1502.

In at least one example, user device 1502 can include a display 1516. Depending on the type of computing device(s) used as the user device 1502, the display 1516 can employ any suitable display technology. For example, the display 1516 can be a liquid crystal display, a plasma display, a light emitting diode display, an OLED (organic light-emitting diode) display, an electronic paper display, or any other suitable type of display able to present digital content thereon. In at least one example, the display 1516 can be an augmented reality display, a virtual reality display, or any other display able to present and/or project digital content. In some examples, the display 1516 can have a touch sensor associated with the display 1516 to provide a touchscreen display configured to receive touch inputs for enabling interaction with a graphic interface presented on the display 1516. Accordingly, implementations herein are not limited to any particular display technology. Alternatively, in some examples, the user device 1502 may not include the display 1516, and information can be presented by other means, such as aurally, haptically, etc.

In addition, the user device 1502 can include sensor(s) 1518. The sensor(s) 1518 can include a GPS device able to indicate location information. Further, the sensor(s) 1518 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users 614 entering a brick-and-mortar store of a merchant. In some cases, location may be used to control media content playback, such as by "handing off" playback of a particular media content item from one device to another responsive to a user crossing a geofence or other location threshold. Location can be used in additional or alternative ways as well.

In examples, the user device 1502 includes a codec system, which may comprise an encoder 1546 and/or a decoder 1548. The encoder 1546 is configured to encode a data stream or signal from an analog signal (e.g., an analog audio signal, an analog video signal, etc.) to a digital signal for transmission or storage. The decoder 1548 is configured to convert the digital signal back to an analog signal, such as for playback or editing. In some cases, the encoder 1546 may be configured to encode the data stream or analog signal in an encrypted format, and the decoder 1548 may accordingly be configured to decrypt the digital signal as part of the decoding process (e.g., using a cryptographic key). Additionally, in some examples, the encoder 1546 may compress data to reduce transmission bandwidth and/or storage space for the digital signal. One example of a compression codec system is a lossless codec, in which the digital data stream is a compressed format of the original data stream, but retains all of the information present in the original data stream. Another example of a compression codec system is a lossy codec which reduces the quality of the digital data stream but can increase the compression of the data stream relative to lossless codec systems. The codec system comprising the encoder 1546 and/or the decoder 1548 may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1500, the server 1504 may include an encoder 1546 and/or a decoder 1548 as well.

Additionally, the user device 1502 can include various other components that are not shown, examples of which include removable storage, a power source, such as a battery and power control unit, a barcode scanner, a printer, a cash drawer, and so forth.

In addition, in some examples, the user device 1502 can include, be connectable to, or otherwise be coupled to a reader device 1526, for reading payment instruments and/or identifiers associated with payment objects. In some examples, as described above, the reader device 1526 can plug in to a port in the user device 1502, such as a microphone port, a headphone port, an audio-jack, a data port, or other suitable port. In additional or alternative examples, the reader device 1526 can be coupled to the user device 1502 via another wired or wireless connection, such as via a Bluetooth®, BLE, and so on. The reader device 1526 can include a read head for reading a magnetic strip of a payment card, and further can include encryption technology for encrypting the information read from the magnetic strip. Additionally or alternatively, the reader device 1526 can be an EMV payment reader, which in some examples, can be embedded in the user device 1502. Moreover, numerous other types of readers can be employed with the user device 1502 herein, depending on the type and configuration of the user device 1502.

The reader device 1526 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1526 may include hardware implementation, such as slots, magnetic tracks, and rails with one or more sensors or electrical contacts to facilitate detection and acceptance of a payment instrument. That is, the reader device 1526 may include hardware implementations to enable the reader device 1526 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1526 may also include a biometric sensor to receive and process biometric characteristics and process them as payment instruments, given that such biometric characteristics are registered with the payment service and connected to a financial account with a bank server.

The reader device 1526 may include processing unit(s), computer-readable media, a reader chip, a transaction chip, a timer, a clock, a network interface, a power supply, and so on. The processing unit(s) of the reader device 1526 may execute one or more components and/or processes to cause the reader device 1526 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1526, the computer-readable media may include volatile memory (such as RAM), non-volatile memory (such as ROM, flash memory, miniature hard drive, memory card, or the like), or some combination thereof. In at least one example, the computer-readable media of the reader device 1526 may include at least one component for performing various functions as described herein.

The reader chip may perform functionalities to control the operations and processing of the reader device 1526. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1506, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1526. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1502, which can be a POS terminal, and the reader device 1526 are shown as separate devices, in additional or alternative examples, the user device 1502 and the reader device 1526 can be part of a single device, which may be a battery-operated device. In such an example, components of both the user device 1502 and the reader device 1526 may be associated with the single device. In some examples, the reader device 1526 can have a display integrated therewith, which can be in addition to (or as an alternative of) the display 1516 associated with the user device 1502.

The server(s) 1504 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1504 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1504 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1504 can include one or more processors 1528, one or more computer-readable media 1530, one or more I/O devices 1532, and one or more communication interfaces 1534. Each processor 1528 can be a single processing unit or a number of processing units, and can include single or multiple computing units or multiple processing cores. The processor(s) 1528 can be implemented as one or more microprocessors, microcomputers, microcontrollers, digital signal processors, central processing units, state machines, logic circuitries, and/or any devices that manipulate signals based on operational instructions. For example, the processor(s) 1528 can be one or more hardware processors and/or logic circuits of any suitable type specifically programmed or configured to execute the algorithms and processes described herein. The processor(s) 1528 can be configured to fetch and execute computer-readable instructions stored in the computer-readable media 1530, which can program the processor(s) 1528 to perform the functions described herein.

The computer-readable media 1530 can include volatile and nonvolatile memory and/or removable and non-removable media implemented in any type of technology for storage of information, such as computer-readable instructions, data structures, program components, or other data. Such computer-readable media 1530 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1504, the computer-readable media 1530 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1530 can be used to store any number of functional components that are executable by the processor(s) 1528. In many implementations, these functional components comprise instructions or programs that are executable by the processors 1528 and that, when executed, specifically configure the one or more processors 1528 to perform the actions attributed above to the service provider and/or payment processing service. Functional components stored in the computer-readable media 1530 can optionally include the product photography service 108 (including the sub-components 140 and/or 146, and/or the AI model 134 depicted in FIG. 1), a merchant component 1536, a training component 1538, and one or more other components and data 1540.

The merchant component 1536 can be configured to receive transaction data from POS systems, such as the POS system 1124 described above with reference to FIG. 11. The merchant component 1536 can transmit requests (e.g., authorization, capture, settlement, etc.) to payment service server computing device(s) to facilitate POS transactions between merchants and customers. The merchant component 1536 can communicate the successes or failures of the POS transactions to the POS systems.

The training component 1538 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1502 and/or the server(s) 1504 for use at a time after the data models have been trained (e.g., at runtime).

The one or more other components and data 1540 can include programs, drivers, etc., and the data used or generated by the functional components described herein. Further, the server(s) 1504 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1530 can additionally include an operating system 1542 for controlling and managing various functions of the server(s) 1504.

The communication interface(s) 1534 can include one or more interfaces and hardware components for enabling communication with various other devices, such as over the network(s) 1506 or directly. For example, communication interface(s) 1534 can enable communication through one or more network(s) 1506, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1506 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1504 can further be equipped with various I/O devices 1532. Such I/O devices 1532 can include a display, various user interface controls (e.g., buttons, joystick, keyboard, mouse, touch screen, biometric or sensory input devices, etc.), audio speakers, connection ports and so forth.

In at least one example, the system 1500 can include a datastore 1544 that can be configured to store data that is accessible, manageable, and updatable. The data store 1544 may be the same as or similar to the data store(s) 114 introduced in FIG. 1. In some examples, the datastore 1544 can be integrated with the user device 1502 and/or the server(s) 1504. In other examples, as shown in FIG. 15, the datastore 1544 can be located remotely from the server(s) 1504 and can be accessible to the server(s) 1504. The datastore 1544 can comprise multiple databases and/or servers connected locally and/or remotely via the network(s) 1506.

In at least one example, the datastore 1544 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1544 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1544 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A computer-implemented method comprising:

capturing, by an application executing on an electronic device of a user, and using a camera of the electronic device, an image of an item;

obtaining, by the application, first image data that identifies a real-world background in the image based on a segmentation of the image;

presenting, by the application, on a display of the electronic device, a set of descriptors that are selectable by the user to substitute an artificial intelligence (AI)-generated background for the real-world background;

receiving, by the application, user input indicating a selected descriptor of the set of descriptors;

generating, by the application, prompt data representing a prompt based on a combination of a string of words and the selected descriptor;

sending, by the electronic device, the first image data and the prompt data to a server computer that hosts a trained AI model;

receiving, by the electronic device, from the server computer, second image data output by the trained AI model, the second image data representing multiple AI-generated images with different AI-generated backgrounds; and presenting, by the application, on the display, and based on the second image data, multiple candidate images with the different AI-generated backgrounds for selection by the user.

2. The computer-implemented method of claim 1, further comprising:

obtaining, by the application, the multiple candidate images based on overlaying the item extracted from the image on respective portions of the multiple AI-generated images, wherein the multiple candidate images feature the item extracted from the image and the different AI-generated backgrounds.

3. The computer-implemented method of claim 1, further comprising, prior to the receiving of the second image data from the server computer:

sending, by the electronic device, a seed parameter value to the server computer, wherein the seed parameter value is used by the server computer to generate one or more additional seed parameter values, and wherein the seed parameter value and the one or more additional seed parameter values cause the trained AI model to generate the different AI-generated backgrounds in the multiple AI-generated images instead of generating a common AI-generated background for the multiple AI-generated images.

4. The computer-implemented method of claim 1, wherein the obtaining of the first image data comprises:

using, by the application, a second trained AI model to generate a segmented image at a first resolution based at least in part on an analysis of the image, the segmented image having a first subset of pixels of a first color to identify the real-world background in the image and a second subset of pixels of a second color to identify the item in the image; and using, by the application, a third trained AI model to increase a resolution of the segmented image from the first resolution to a second resolution greater than the first resolution, wherein the first image data represents the segmented image at the second resolution.

5. An electronic device comprising:

a camera;

a display;

one or more processors; and memory storing computer-executable instructions that, when executed by the one or more processors, cause the one or more processors to perform operations comprising:

capturing, by executing an application on the electronic device and using the camera, an image of an item;

obtaining first image data that identifies a real-world background in the image;

presenting, on the display, via the application, a user interface for a user of the electronic device to indicate a descriptor;

receiving, via the user interface, an indication of the descriptor;

generating prompt data representing a prompt based at least in part on a combination of a string of words and the descriptor;

sending the first image data and the prompt data to a server computer;

receiving, from the server computer, second image data output by a trained artificial intelligence (AI) model, the second image data representing an AI-generated image with an AI-generated background; and presenting, on the display, via the application, and based at least in part on the second image data, a candidate image with the AI-generated background for selection by the user.

6. The electronic device of claim 5, the operations further comprising:

obtaining the candidate image based at least in part on overlaying the item extracted from the image on a portion of the AI-generated image, wherein the candidate image features the item extracted from the image and the AI-generated background.

7. The electronic device of claim 5, wherein:

the capturing comprises capturing multiple images of the item, the multiple images including the image of the item; and the first image data further includes the multiple images without the real-world background in the multiple images.

8. The electronic device of claim 5, the operations further comprising:

receiving a second indication to add the item to an electronic catalogue associated with a merchant; and causing the candidate image, or a final image generated based at least in part on the candidate image, to be featured in the electronic catalogue based at least in part on the receiving of the second indication.

9. The electronic device of claim 5, the operations further comprising:

determining some, but not all, of the string of words based at least in part on the descriptor.

10. The electronic device of claim 5, wherein the second image data represents multiple AI-generated images with different AI-generated backgrounds, the multiple AI-generated images including the AI-generated image, and the operations further comprise, prior to the receiving of the second image data from the server computer:

sending a seed parameter value to the server computer, wherein the seed parameter value causes the trained AI model to generate the different AI-generated backgrounds in the multiple AI-generated images.

11. The electronic device of claim 5, the operations further comprising, prior to the receiving of the second image data from the server computer:

presenting, on the display, via the application, and within a frame, a preview image of the item extracted from the image; and receiving a second indication to at least one of reposition the preview image within the frame, resize the preview image within the frame, or reorient the preview image within the frame, wherein the first image data further identifies, based at least in part on the second indication, at least one of a position of the item within the frame, a size of the item within the frame, or an orientation of the item within the frame.

12. The electronic device of claim 5, wherein the obtaining of the first image data comprises:

using a second trained AI model to generate a segmented image at a first resolution based at least in part on an analysis of the image, the segmented image having a first subset of pixels of a first color to identify the real-world background in the image and a second subset of pixels of a second color to identify the item in the image; and using a third trained AI model to increase a resolution of the segmented image from the first resolution to a second resolution greater than the first resolution, wherein the first image data represents the segmented image at the second resolution.

13. The electronic device of claim 5, the operations further comprising:

using a second trained AI model to apply AI-generated lighting to the item extracted from the image;

presenting, on the display, via the application, a preview image of the item with the AI-generated lighting applied to the item and without the real-world background; and receiving a second indication of a confirmation from the user to feature the item in a final image with the AI-generated lighting applied to the item.

14. The electronic device of claim 5, wherein:

the presenting of the user interface comprises presenting a set of descriptors; and the descriptor is a selected descriptor of the set of descriptors.

15. The electronic device of claim 5, wherein the second image data represents multiple AI-generated images with different AI-generated backgrounds, the multiple AI-generated images including the AI-generated image, wherein the candidate image with the AI-generated background comprises multiple candidate images with the different AI-generated backgrounds, and the operations further comprise:

collecting user data associated with the user, the user data indicating which of the multiple candidate images the user selected; and sending the user data to the server computer to retrain the trained AI model.

16. The electronic device of claim 9, wherein a remainder of the string of words is a static portion of the string of words.

17. A computer-implemented method comprising:

receiving, by a server computer, from an electronic device of a user:

first image data that identifies a real-world background in an image of an item captured using a camera associated with the electronic device; and a descriptor indicated by the user;

generating, by the server computer, prompt data representing a prompt based at least in part on a combination of a string of words and the descriptor;

generating, by the server computer, based at least in part on the first image data, and using a first trained artificial intelligence (AI) model, an image map;

generating, by the server computer, based at least in part on the image map and the prompt data, and using a second trained AI model, second image data representing an AI-generated image with an AI-generated background; and sending, by the server computer, the second image data to the electronic device.

18. The computer-implemented method of claim 17, wherein the second image data represents multiple AI-generated images with different AI-generated backgrounds, the multiple AI-generated images including the AI-generated image, and the computer-implemented method further comprises:

receiving, from the electronic device, a first seed parameter value; and generating, by the server computer, a second seed parameter value based at least in part on the first seed parameter value, wherein a first AI-generated background of the different AI-generated backgrounds is based at least in part on the first seed parameter value, and wherein a second AI-generated background of the different AI-generated backgrounds is based at least in part on the second seed parameter value.

19. The computer-implemented method of claim 17, further comprising:

receiving, from the electronic device, a prompt influence parameter value that indicates a degree to which the second trained AI model is to be influenced by the prompt data to generate the second image data, wherein the generating of the second image data is based at least in part on the prompt influence parameter value.

20. The computer-implemented method of claim 17, wherein the first image data further includes a preview image of the item with studio lighting applied to the item and without the real-world background.

* * * * *